(12) United States Patent
Michael et al.

(10) Patent No.: US 7,861,413 B2
(45) Date of Patent: Jan. 4, 2011

(54) METHOD OF MAKING A DOZER MAINTENANCE REPAIR FOR A DOZER EQUALIZER LINK USING AN ELASTOMERIC BEARING ASSEMBLY

(75) Inventors: Robert Joseph Michael, Erie, PA (US); William James Galloway, Greenville, PA (US)

(73) Assignee: LORD Corporation, Cary, NC (US)

( * ) Notice: Subject to any disclaimer, the term of this patent is extended or adjusted under 35 U.S.C. 154(b) by 1092 days.

(21) Appl. No.: 10/505,602

(22) PCT Filed: Dec. 9, 2003

(86) PCT No.: PCT/US03/39169

§ 371 (c)(1),
(2), (4) Date: Feb. 28, 2005

(87) PCT Pub. No.: WO2004/052714

PCT Pub. Date: Jun. 24, 2004

(65) Prior Publication Data

US 2005/0145397 A1   Jul. 7, 2005

(51) Int. Cl.
*B21D 53/10* (2006.01)
*B23P 6/00* (2006.01)
*B60G 11/22* (2006.01)

(52) U.S. Cl. .............. 29/896.93; 29/898.01; 29/898.07; 29/898.08; 29/402.01; 29/402.03; 29/402.08; 29/451; 29/435; 29/235; 267/292; 180/9.54

(58) Field of Classification Search .............. 29/896.93, 29/898.01, 898.07, 898.08, 402.01, 402.03, 29/402.08, 451, 235, 435; 267/292, 294, 267/140.11, 141.1, 141.2; 180/9.5, 9.52, 180/9.54
See application file for complete search history.

(56) References Cited

U.S. PATENT DOCUMENTS 2,786,724 A   3/1957   Armington et al.
2,936,841 A   5/1960   Mazzarins (Continued)

FOREIGN PATENT DOCUMENTS

EP   0 111 108 A2   6/1984

(Continued)

*Primary Examiner*—David P Bryant
*Assistant Examiner*—Sarang Afzali
(74) *Attorney, Agent, or Firm*—Edward F. Murphy

(57) ABSTRACT

A moving tracks dozer equalizer link elastomeric bearing assembly including a concentric outer member operable for securely engaging a equalizer link bore structure associated with a first end portion of an equalizer link structural member, wherein the concentric outer member is disposed substantially within the equalizer link bore structure. The dozer equalizer link elastomeric bearing assembly also including a concentric inner member operable for securely engaging a pin structure associated with a second moving track roller frame assembly structural member, wherein the concentric inner member is disposed substantially within the concentric outer member. The dozer equalizer link elastomeric bearing assembly further including an elastomeric section disposed between the concentric inner member and the concentric outer member, wherein the elastomeric section is bonded to an outer surface of the inner member and an inner surface of the outer member, and wherein the elastomeric section is operable for accommodating axial, cocking, and torsion motions of the second moving track roller frame assembly structural member pin structure relative to the first equalizer link structural member.

9 Claims, 21 Drawing Sheets

U.S. PATENT DOCUMENTS

| | | | |
|---|---|---|---|
| 2,988,159 A | 6/1961 | Weber | |
| 3,096,840 A | 7/1963 | Mazzarins | |
| 3,576,226 A | 4/1971 | Copeland | |
| 3,666,301 A | 5/1972 | Jorn | |
| 3,825,074 A | 7/1974 | Stedman et al. | |
| 3,826,325 A | 7/1974 | Purcell et al. | |
| 3,872,941 A | 3/1975 | Copeland | |
| 3,889,769 A | 6/1975 | Blomstrom et al. | |
| 4,018,295 A | 4/1977 | Hasselbacher | |
| 4,073,047 A * | 2/1978 | Fishbaugh et al. | 29/450 |
| 4,119,157 A | 10/1978 | Schuck et al. | |
| 4,232,754 A | 11/1980 | Corrigan et al. | |
| 4,364,443 A | 12/1982 | Sato et al. | |
| 4,385,673 A | 5/1983 | Olt, Jr. | |
| 4,553,760 A | 11/1985 | Reed et al. | |
| 4,690,231 A | 9/1987 | Riml | |
| 4,772,151 A | 9/1988 | Lammers et al. | |
| 4,838,373 A | 6/1989 | Price et al. | |
| 4,844,195 A | 7/1989 | Deli et al. | |
| 5,033,722 A | 7/1991 | Lammers | |
| 5,482,121 A | 1/1996 | Draney et al. | |
| 6,125,539 A | 10/2000 | Ogawa et al. | |
| 6,298,933 B1 | 10/2001 | Simmons | |
| 6,854,723 B2 | 2/2005 | Ogawa et al. | |
| 6,926,611 B2 * | 8/2005 | Rivin | 464/70 |

FOREIGN PATENT DOCUMENTS

WO     WO 02/12748 A1     2/2002

* cited by examiner

METHOD OF MAKING A DOZER MAINTENANCE REPAIR FOR A DOZER EQUALIZER LINK USING AN ELASTOMERIC BEARING ASSEMBLY

FIELD OF THE INVENTION

The present invention relates generally to a moving tracks dozer equalizer link elastomeric bearing assembly and an associated pin structure. More specifically, the present invention relates to an elastomeric bearing assembly for use in conjunction with the equalizer link of a tractor or other earth-moving vehicle and an associated pin structure operable for securing the elastomeric bearing assembly and the equalizer link to the roller frame assembly of the tractor or other earth-moving vehicle.

BACKGROUND OF THE INVENTION

A typical tractor or other earth-moving vehicle, also referred to herein as a "dozer," includes an equalizer link operable for securing the cab assembly of the dozer to the moving tracks or wheels of the dozer, allowing for uniform track-to-ground or wheel-to-ground contact. This equalizer link consists of a hot-rolled steel member or forging. A cylindrical center bearing is provided to secure the equalizer link to the cab assembly of the dozer and two spherical bearings are provided at each end of the equalizer link to secure the equalizer link to a roller frame assembly associated with the moving tracks or wheels of the dozer, accommodating axial, cocking, and torsion motions. Typically, these spherical end bearings are manufactured from hardened steel and constitute a major wear item. Although the spherical end bearings are sealed and lubricated, the spherical end bearings typically last from about 1,000 hours to about 3,000 hours and, due to inadequate lubrication, fail. Such failure occurs because of the proximity of the spherical end bearings to the tracks or wheels of the dozer and the resulting exposure to dirt, mud, and debris. Failure of the spherical end bearings limits articulation and may destroy the end joints of the equalizer link. Typically, this necessitates expensive re-manufacturing of the retaining-ring groove, seal, and/or bore of the end joints of the equalizer link. For example, a major reworking of the equalizer link may cost as much as about $2,700 and may lead to dozer downtime of about 1 week. Even in a non-failure case, the spherical end bearings must be regularly lubricated and maintained.

Thus, what is needed is an elastomeric bearing assembly for use in conjunction with the equalizer link of a tractor or other earth-moving vehicle and an associated pin structure operable for securing the elastomeric bearing assembly and the equalizer link to the roller frame assembly of the tractor or other earth-moving vehicle. Preferably, this elastomeric bearing assembly may be used in conjunction with the cylindrical center hearing or the spherical end bearings of the equalizer link, providing a cost-effective, low-maintenance option for reducing and/or preventing equalizer link failure.

BRIEF SUMMARY OF THE INVENTION

The present invention provides an elastomeric bearing assembly for use in conjunction with the equalizer link of a tractor or other earth-moving vehicle and an associated pin structure operable for securing the elastomeric bearing assembly and the equalizer link to the roller frame assembly of the tractor or other earth-moving vehicle. This elastomeric bearing assembly may be used in conjunction with the cylindrical center bearing or the spherical end bearings of the equalizer link, providing a cost-effective, low-maintenance option for reducing and/or preventing equalizer link failure. Advantageously, the elastomeric bearing assembly of the present invention does not require complex machining and allows +/−3.0 degrees cocking and +/−3.5 degrees torsion with acceptable strains. A radial load of about 25.0 K produces moderate compression stresses that are well within specified requirements. These compression stresses may be further reduced with a large package width. Because the elastomeric bearing assembly of the present invention incorporates rubber, it does not require lubrication and it prevents relative motion or sliding between metal surfaces.

In one embodiment of the present invention, an elastomeric bearing assembly includes a concentric outer member operable for securely engaging a bore structure associated with a first structural member, wherein the concentric outer member is disposed substantially within the bore structure. The elastomeric bearing assembly also includes a concentric inner member operable for securely engaging a pin structure associated with a second structural member, wherein the concentric inner member is disposed substantially within the concentric outer member. The elastomeric bearing assembly further includes an elastomeric section disposed between the concentric inner member and the concentric outer member, wherein the elastomeric section is bonded to a surface of the inner member and a surface of the outer member, and wherein the elastomeric section is operable for accommodating axial, cocking, and torsion motions of the second structural member relative to the first structural member.

In another embodiment of the present invention, an elastomeric bearing assembly for use in conjunction with the equalizer link of a tractor or other earth-moving vehicle includes a concentric outer member operable for securely engaging a bore structure associated with a first structural member, wherein the concentric outer member is disposed substantially within the bole structure. The elastomeric bearing assembly also includes a concentric inner member operable for securely engaging a pin structure associated with a second structural member, wherein the concentric inner member is disposed substantially within the concentric outer member. The elastomeric bearing assembly further includes an elastomeric section disposed between the concentric inner member and the concentric outer member, wherein the elastomeric section is bonded to a surface of the inner member and at surface of the outer member, and wherein the elastomeric section is operable for accommodating axial, cocking, and torsion motions of the second structural member relative to be the first structural member.

In a further embodiment of the present invention, an elastomeric bearing assembly includes a concentric outer member and a concentric inner member, wherein the concentric inner member is disposed substantially within the concentric outer member. The elastomeric bearing assembly also includes an elastomeric section disposed between the concentric inner member and the concentric outer member, wherein the elastomeric section is bonded to a surface of the inner member and a surface of the outer member, and wherein the elastomeric section is operable for accommodating axial, cocking, and torsion motions of the concentric inner member relative to the concentric outer member.

In a still further embodiment of the present invention, a method for installing an elastomeric bearing assembly includes providing: a concentric outer member operable for securely engaging a bore structure associated with a first structural member; a concentric inner member operable for securely engaging a pin structure associated with a second structural member, wherein the concentric inner member is disposed substantially within the concentric outer member; and an elastomeric section disposed between the concentric inner member and the concentric outer member, wherein the elastomeric section is bonded to a surface of the inner member and a surface of the outer member, and wherein the elastomeric section is operable for accommodating axial, cocking, and torsion motions of the second structural member relative to the first structural member. The method for installing the elastomeric bearing assembly also includes pressing the concentric outer member, the concentric inner member, and the elastomeric section into the bore structure using a ram apparatus, thereby precompressing the elastomeric section.

The invention includes a method of making an earth-moving track-type tractor vehicle dozer maintenance repair of a moving tracks dozer equalizer link with a worn lubricated bearing by removing the worn lubricated bearing from the dozer equalizer link end and installing in place an unlubricated laminated elastomeric bearing assembly with a concentric outer nonextensible solid member operable for securely engaging the dozer equalizer link bore, a concentric inner nonextensible solid member operable for securely engaging a pin stricture, with the concentric inner member disposed substantially within the concentric outer member, and an elastomeric section elastomer bonded between the concentric inner member and the concentric outer member.

The invention includes a moving track-type tractor vehicle with an equalizer link between a first moving track roller frame assembly and second moving track roller frame assembly with the equalizer link having a substantially circular with an unlubricated laminated elastomeric bearing assembly received in the bore with the elastomeric bearing assembly concentric outer nonextensible solid member securely engaging the bore, a concentric inner nonextensible solid member disposed substantially within the concentric outer member, and an elastomeric section bonded between the concentric inner member and the concentric outer member with the elastomeric section radially compressed between the concentric outer and inner member.

The invention includes a method of making a dozer equalizer link elastomeric bearing assembly for a moving tracks dozer equalizer link having a substantially circular equalizer link bore with an inside diameter ID. The method includes providing a tubular nonextensible solid concentric inner member, providing a concentric outer member first outer member nonextensible solid split tubular half with an outside top and a concentric outer member second outer member nonextensible solid split tubular half with an outside bottom, concentrically disposing the tubular nonextensible solid concentric inner member substantially within the concentric outer member first outer member nonextensible solid split tubular half and the concentric outer member second outer member nonextensible solid split tubular half, elastomerically bonding the tubular nonextensible solid concentric inner member to the first outer member nonextensible solid split tubular half and the second outer member nonextensible solid split tubular half with an elastomer with an elastomeric section in between the inner and outer members to form an elastomeric bearing assembly with an outside diameter OD from first outer member nonextensible solid split tubular half outside top to the second outer member nonextensible solid split tubular half outside bottom wherein the elastomeric bearing assembly outside OD is at least a hundred and five percent of the equalizer link bore inside diameter ID.

DETAILED DESCRIPTION OF THE INVENTION

As described above, the present invention provides an elastomeric bearing assembly for use in conjunction with tile equalizer link of a tractor or other earth-moving vehicle and an associated pin structure operable for securing the elastomeric bearing assembly and the equalizer link to the roller frame assembly of the tractor or other earth-moving vehicle. Likewise, the pin structure may be used to secure the elastomeric bearing assembly and the equalizer link to a saddle structure associated with the cab assembly of the tractor or other earth-moving vehicle. Accordingly, this elastomeric bearing assembly may be used in conjunction with the cylindrical center bearing or the spherical end bearings of tile equalizer link, providing a cost-effective, low-maintenance option or reducing and/or preventing equalizer link failure. An equalizer link is illustrated in FIG. 1.

Figure 1:
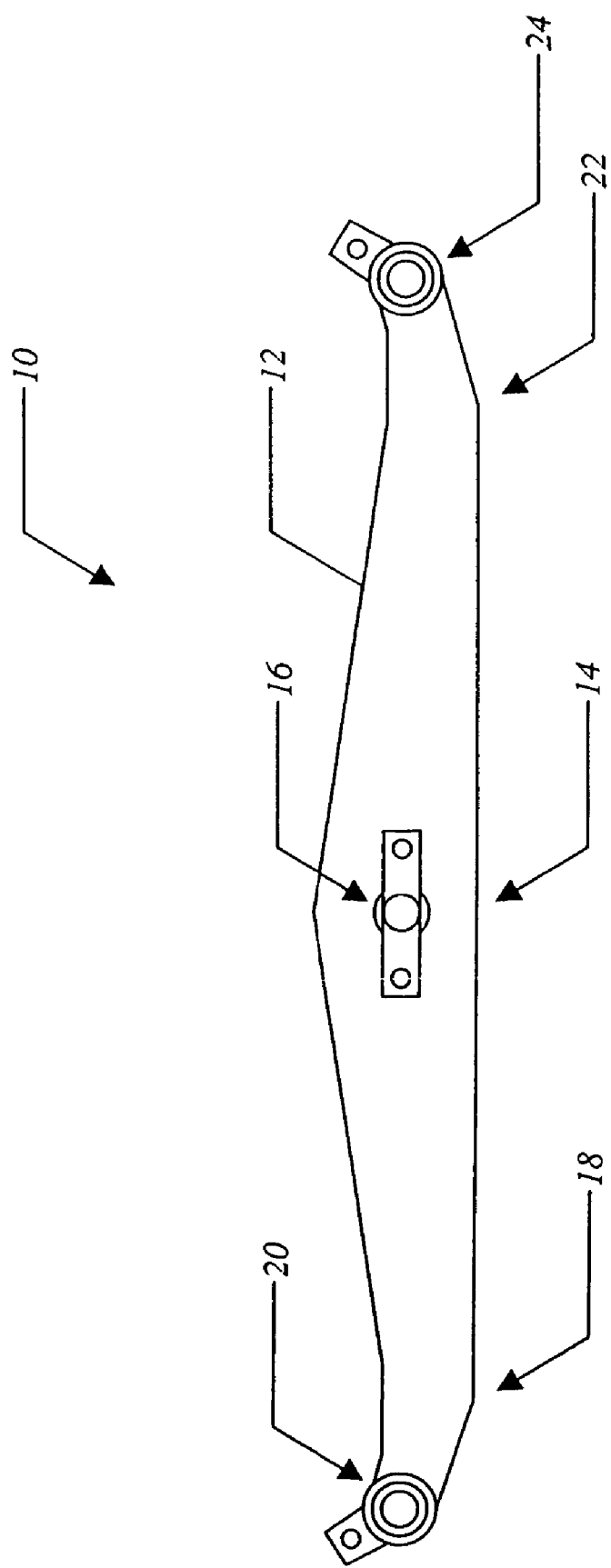
FIG. 1 is a side view of a typical equalizer link operable for securing the cab assembly of a tractor or other earth-moving vehicle to the moving tracks or wheels of the tractor or other earth-moving vehicle, allowing for uniform track-to-ground or wheel-to-ground contact.

Referring to FIG. 1, the equalizer link 10 consists of a structural member 12, such as a hot-rolled steel member, a forging, or the like. The center portion 14 of the structural member 12 includes a cylindrical center bearing 16. A first end portion 18 of the structural member 12 includes a first spherical end bearing 20 and a second end portion 22 of the structural member 12 includes a second spherical end bearing 24. The equalizer link is operable for securing the cab assembly of a tractor or other earth-moving vehicle to the moving tracks or wheels of the tractor or other earth-moving vehicle, allowing for uniform track-to-ground or wheel-to-ground contact. An installed equalizer link 10 is illustrates in FIG. 2.

Figure 2:
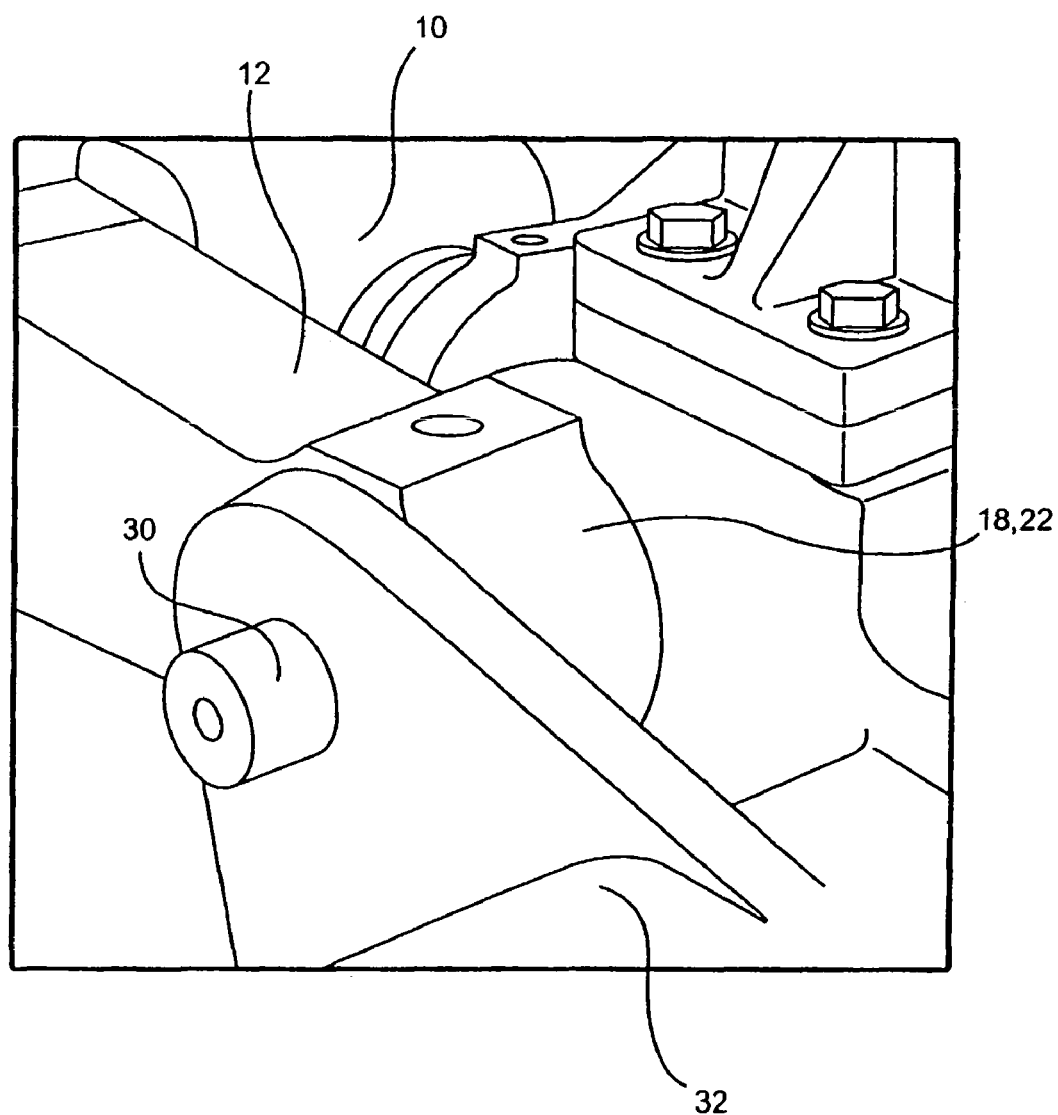
FIG. 2 is a photograph of an equalizer link, such as that illustrated in FIG. 1, installed in a tractor or other earth-moving vehicle.
Figure 3:
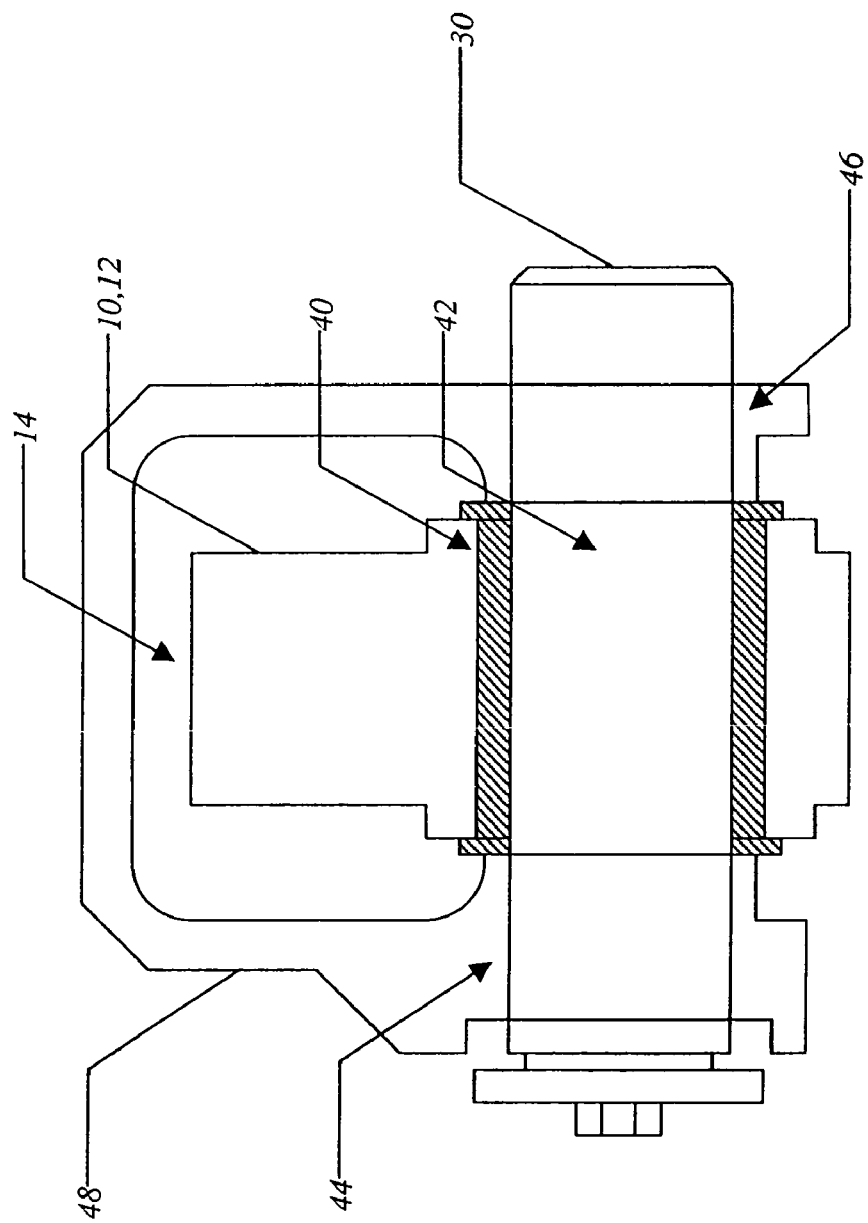
FIG. 3 is a cross-sectional side view of the mechanism by which a cylindrical center bearing of tile equalizer link of FIG. 1 is secured to a saddle structure associated with the cab assembly of a tractor or other earth-moving vehicle.
Figure 4:
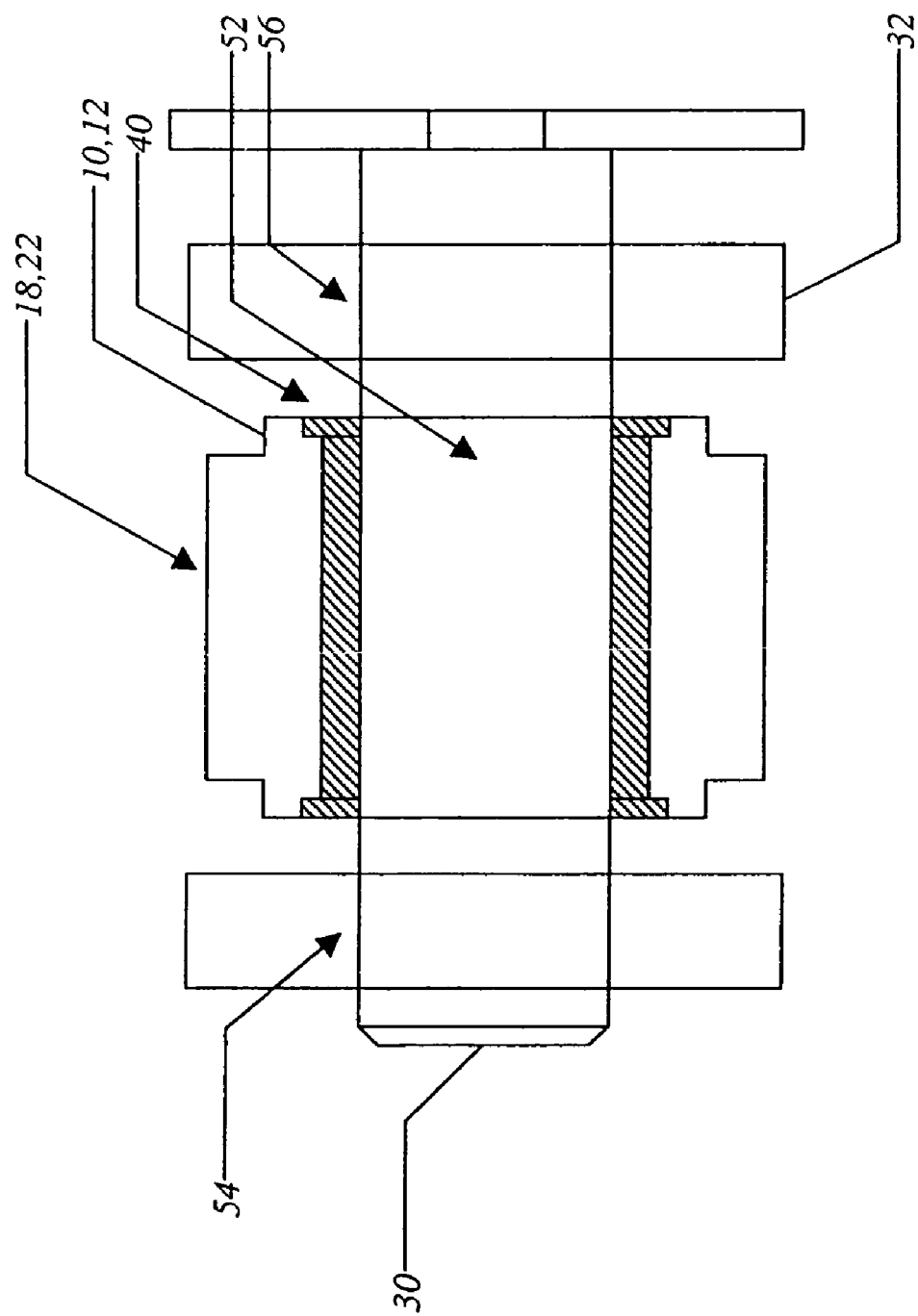
FIG. 4 is a cross-sectional side view of the mechanism by which spherical end bearings of the equalizer link of FIG. 1 ale secured to a roller frame assembly associated with the tracks or wheels of a tractor or other earth-moving vehicle.

Referring to FIG. 2, the cylindrical center bearing 16 (FIG. 1) of the equalizer link 10 is rotatably attached to a saddle structure associated with the cab assembly of the dozer. Likewise, the first spherical end bearing 20 (FIG. 1) disposed within the first end portion 18 of the structural member 12 and the second spherical end bearing 24 (FIG. 1) disposed within the second end portion 22 of the structural member 12 are each attached via a pin structure 30 to a roller frame assembly 32 associated with the moving tracks or wheels (not shown) of the dozer. FIGS. 3 and 4 illustrate the specific mechanisms by which the cylindrical center bearing 16 is secured to the saddle structure (see FIG. 3) and the spherical end bearings 20,24 are secured to the roller frame assembly 32 (see FIG. 4).

Referring to FIG. 3, a bearing assembly 40, such as the elastomeric bearing assembly of the present invention, is disposed within a substantially circular bore 42 running through the center portion 14 of the structural member 12 comprising the equalizer link 10. A pin structure 30, such as the pin structure of the present invention, is inserted through the substantially circular bore 42 running through the center portion 14 of the structural member 12. The pin structure 30 is also inserted through a first substantially circular opening 44 and a second substantially circular opening 46 running through the saddle structure associated with the cab assembly of the dozer, thus securing the equalizer link 10 to the cab assembly.

Referring to FIG. 4, another bearing assembly 40, such as the elastomeric bearing assembly of the present invention, is disposed within a substantially circular bore 52 running through each of the end portions 18,22 of the structural member 12 comprising the equalizer link 10. A pin structure 30, such as the pin structure of the present invention, is inserted through the substantially circular bore 52 running through each of the end portions 18,22 of the structural member 12. The pin structure 30 is also inserted through a first substantially circular opening 54 and a second substantially circular opening 56 running through the roller frame assembly 32 associated with the moving tracks or wheels (not shown) of the dozer, thus securing the equalizer link 10 to the tracks or wheels.

Figure 5:
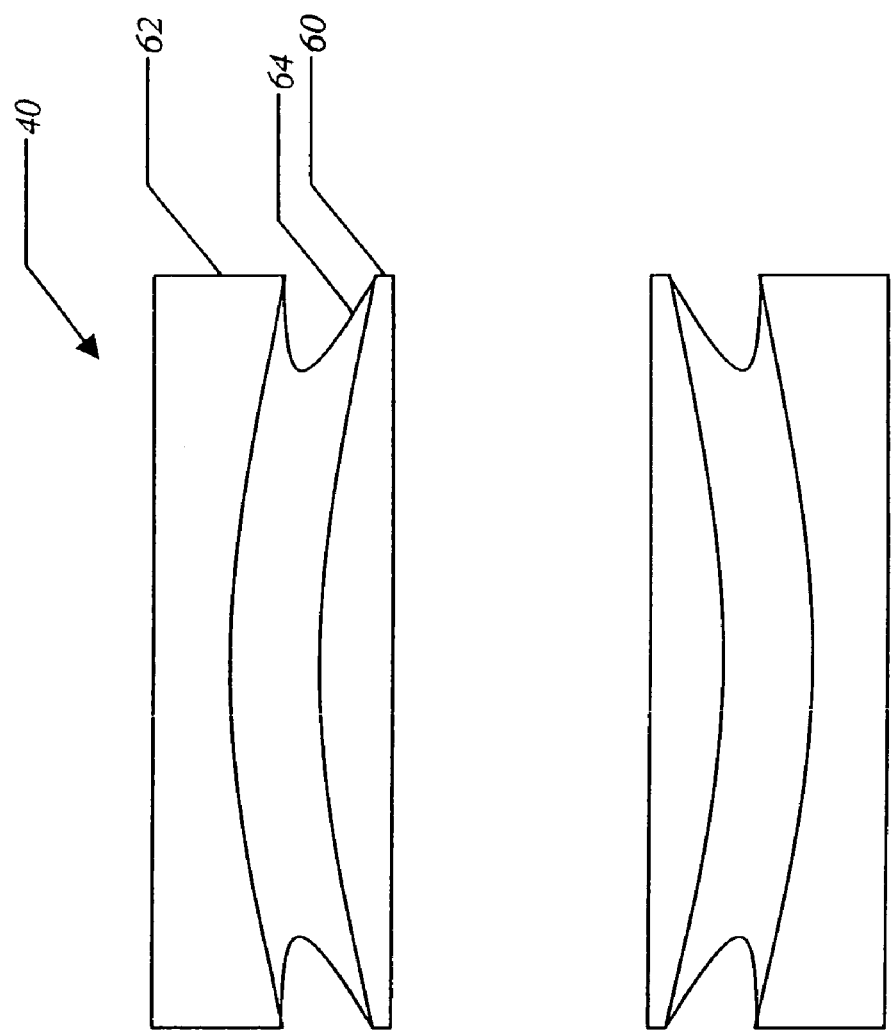
FIG. 5 is a cross-sectional side view of one embodiment of the elastomeric bearing assembly of the present invention.

Referring to FIG. 5, in one embodiment of the present invention, the elastomeric hearing assembly 40 includes an inner member 60 and an outer member 62. The inner member 60 and the outer member 62 may be made of a metal, a metal alloy, a composite, or any other suitable nonextensible solid material. The inner member 60 is positioned adjacent to and concentrically about the surface of the pin structure 30 (FIGS. 2, 3, and 4), described above and described in further detail herein below. Preferably, the inner member 60 securely engages the pin structure 30. Likewise, the outer member 62 is positioned adjacent to and concentrically within the substantially circular 42,52 (FIGS. 3 and 4) running through the center portion 14 (FIG. 3) and/or the end portions 18,22 (FIG. 4) of the structural member 12 (FIGS. 1, 2, 3, and 4). Preferably, the outer member 62 securely engages the substantially circular bore 42,52. An elastomeric section 64, made of rubber or the like, is disposed between and bonded to the surfaces of the inner member 60 and the outer member 62. It should be noted that, in the present embodiment, the inner member 60 and the outer member 62 have corresponding substantially concave and convex shapes, respectively, operable for accommodating axial, cocking, and torsion motions. Additionally, in the present embodiment, the elastomeric section 64 has a substantially elliptical or barrel shape.

Figure 6:
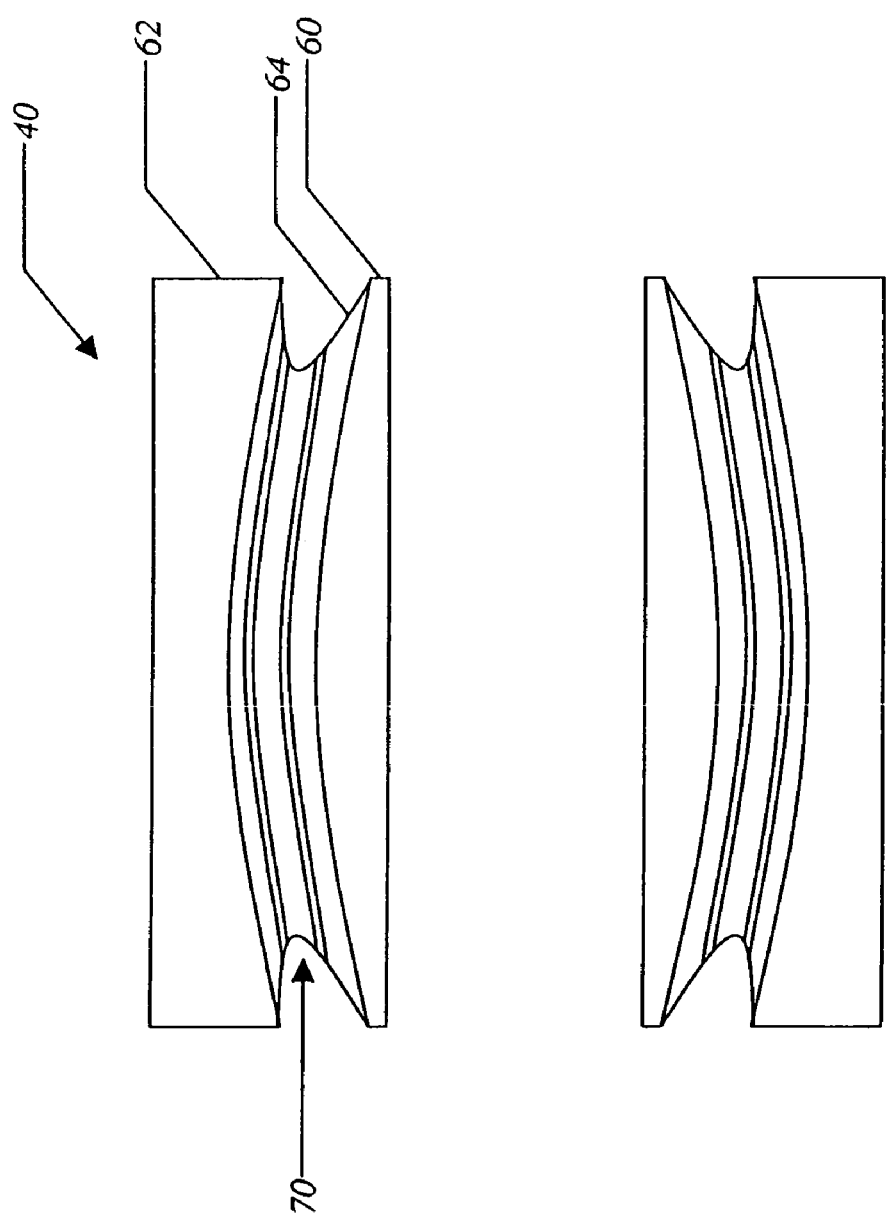
FIG. 6 is a cross-sectional side view of another embodiment of the elastomeric bearing assembly of the present invention.

Referring to FIG. 6, in another embodiment of the present invention, the elastomeric bearing assembly 40 includes an inner member 60 and an outer member 62. The inner member 60 and the outer member 62 may be made of a metal, a metal alloy, a composite, or any other suitable material. The inner member 60 is positioned adjacent to and concentrically about the surface of the pin structure 30 (FIGS. 2, 3, and 4), described above and described in further detail herein below.

Preferably, the inner member 60 securely engages the pin structure 30. Likewise, the outer member 62 is positioned adjacent to and concentrically within the substantially circular bore 42,52 (FIGS. 3 and 4) running through the center portion 14 (FIG. 3) and/or the end portions 18,22 (FIG. 4) of the structural member 12 (FIGS. 1, 2, 3, and 4). Preferably, the outer member 62 securely engages the substantially circular bore 42,52. An elastomeric section 64, made of rubber or the like, is disposed between and bonded to the surfaces of the inner member 60 and the outer member 62. It should be noted that, in the present embodiment, the inner member 60 and the outer member 62 have corresponding substantially concave and convex shapes, respectively, operable for accommodating axial, cocking, and torsion motions. Additionally, in the present embodiment, the elastomeric section 64 has a substantially elliptical or barrel shape. A plurality of concentric shim members 70 are also disposed within the elastomeric section 64. FIG. 6 shows two concentric shim members 70, however, as is readily apparent to those of ordinary skill in the art, a greater or lesser number of concentric shim members 70 may be utilized. The concentric shim members 70 provide strength, rigidity, and stability to the elastomeric section 64. The concentric shim members 70 may be made of a metal, a metal alloy, a composite, or any other suitable nonextensible solid material.

In an alternative embodiment of the present invention, the inner member 60, the outer member 62, and the elastomeric section 64 may each have a substantially cylindrical shape, as opposed to the substantially concave and convex shapes illustrated in FIGS. 5 and 6. Additionally, the ends of the outer member 62 may be crimped, so as to securely engage the substantially circular bore 42,52 running through the center portion 14 and/or the end portions 18,22 of the structural member 12, enhancing the axial retention of the elastomeric bearing assembly 40.

Installation-wise, the elastomeric bearing assembly 40 of the present invention may be forced into the substantially circular bore 42,52 running through the center portion 16 and/or the end portions 18,22 of the structural member 12 using a ram or the like. Preferably, the substantially circular bore 42,52 running through the center portion 16 and/or the end portions 18,22 of the structural member 12 has a substantially funnel shape operable for receiving the elastomeric bearing assembly 40. Alternatively, a substantially funnel-shaped piece may be temporarily attached to the substantially circular bore 42,52 running through the center portion 16 and/or the end portions 18,22 of tile structural member 12 for receipt of the elastomeric bearing assembly 40. Advantageously, the installation technique described above precompresses the elastomeric bearing assembly 40, enhancing its durability and general operation. Additionally, the elastomer contours utilized in conjunction with the elastomeric section 64 of the present invention accommodate elastomer bulge during precompression, reducing exposure to dirt, mud, and debris that may cause premature damage. Preferably the elastomer contours of the elastomeric bearing assembly 40 when installed in the equalizer link and used do extend beyond the edges of inner member 60 and outer member 62, and preferably the elastomer contours of the elastomeric section 64 are recessed in from the edges of inner member 60 and outer member 62.

The pin structure 30 (FIGS. 2, 3, and 4) of the present invention is operable for securing the elastomeric bearing assembly 40 of the present invention between two abutments, such as those associated with the saddle structure 48 (FIG. 3)

associated with the cab assembly of the dozer or the roller frame assembly 32 (FIGS. 2 and 4) associated with the tracks or wheels of the dozer.

Figure 7:
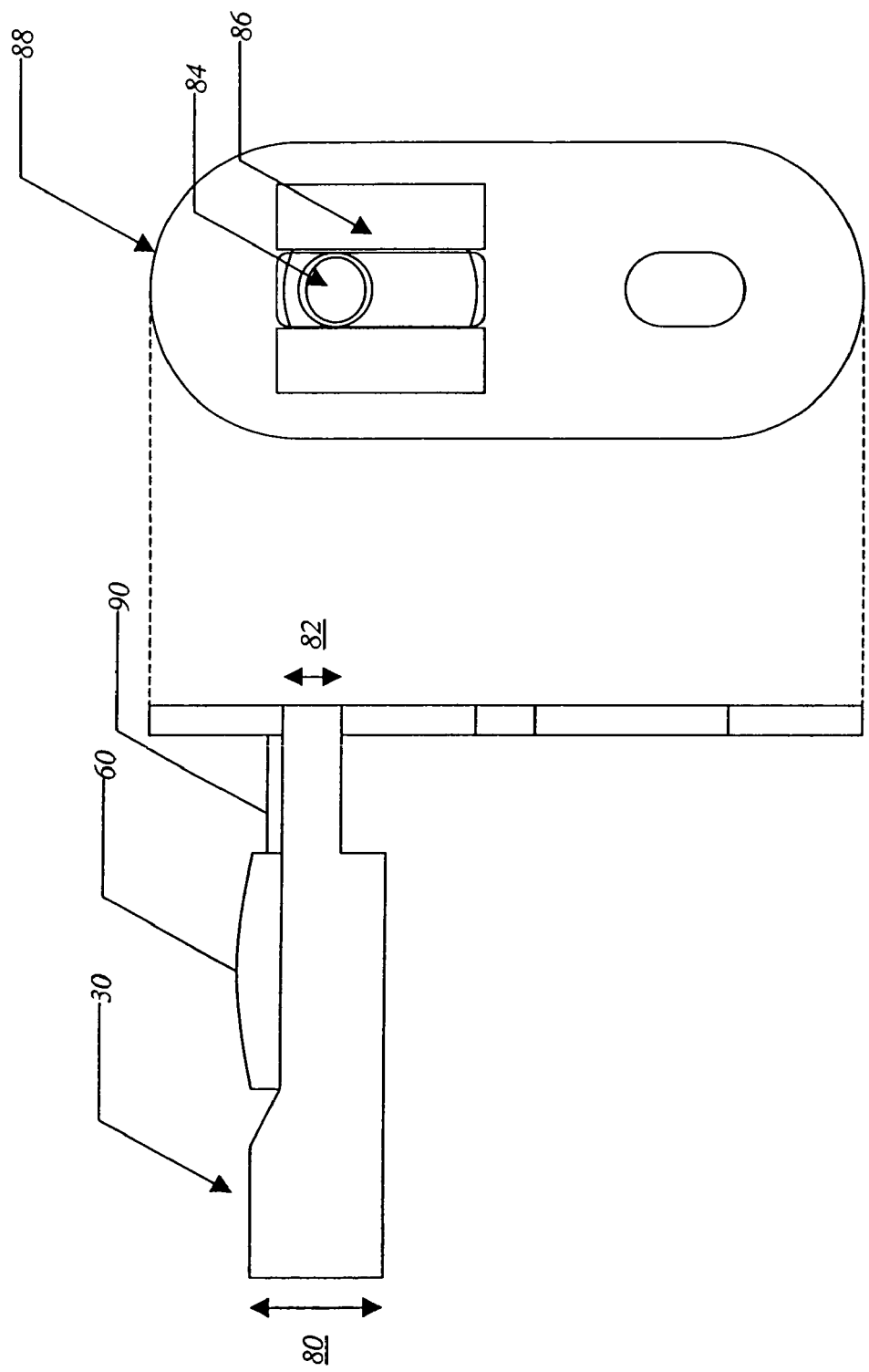
FIG. 7 is a cross-sectional side view of one embodiment of a pin structure associated with the elastomeric bearing assembly of the present invention.
Figure 8:
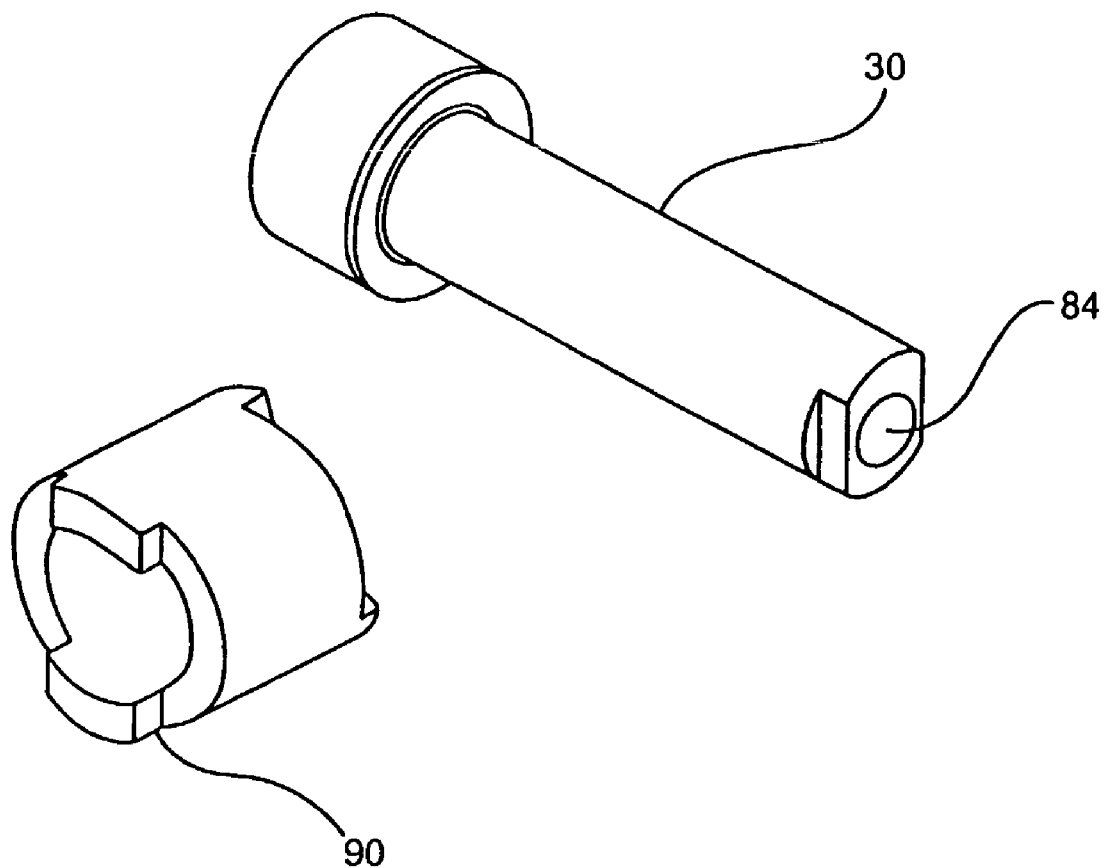
FIG. 8 is a perspective view of the components of tile pin structure of FIG. 7.
Figure 9A:
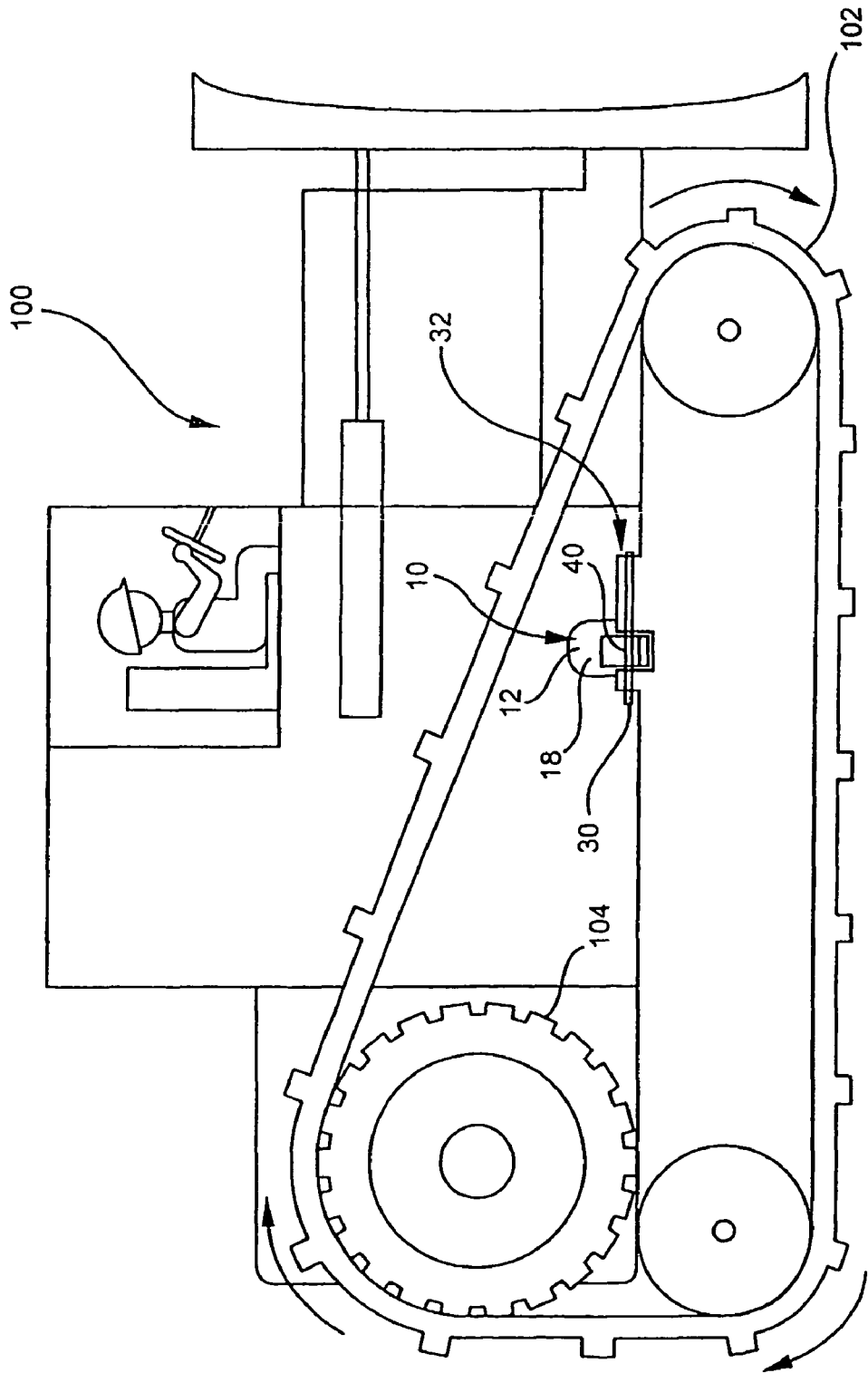
FIG. 9A-B show embodiments of the invention.
Figure 9B:
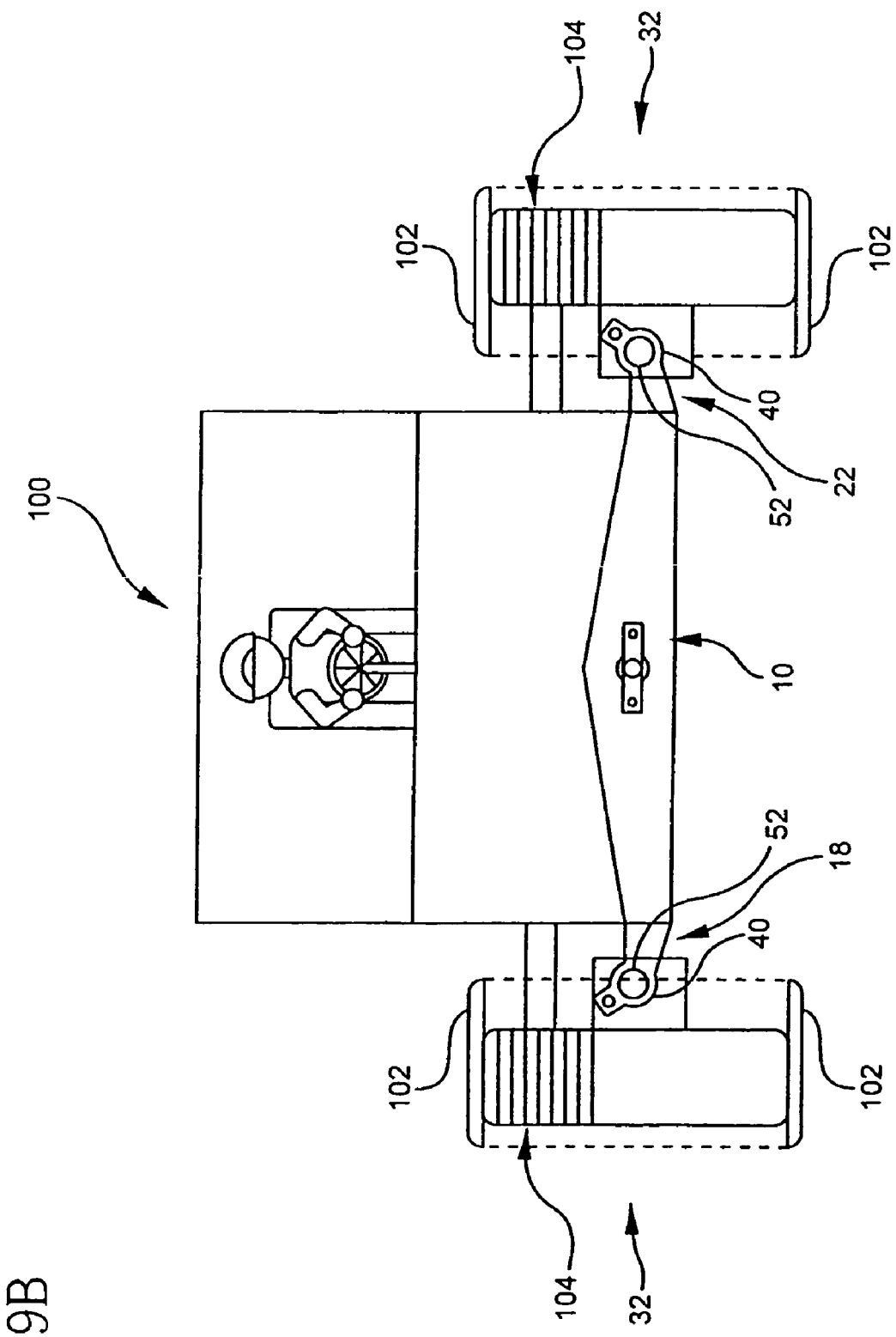
Figure 10A:
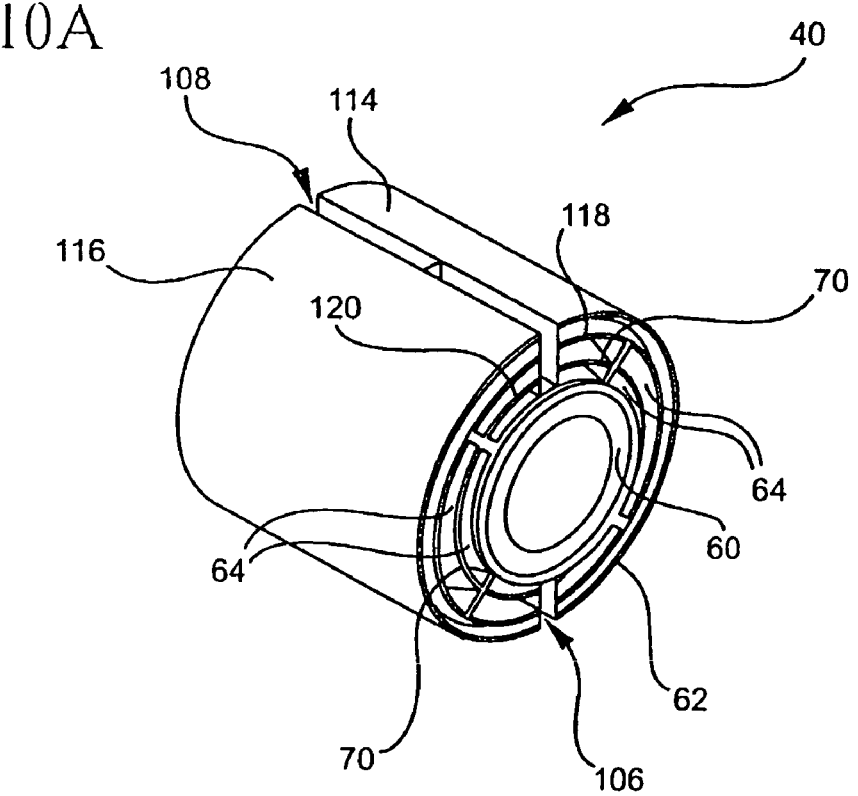
FIG. 10A-F show embodiments of the invention.
Figure 10B:
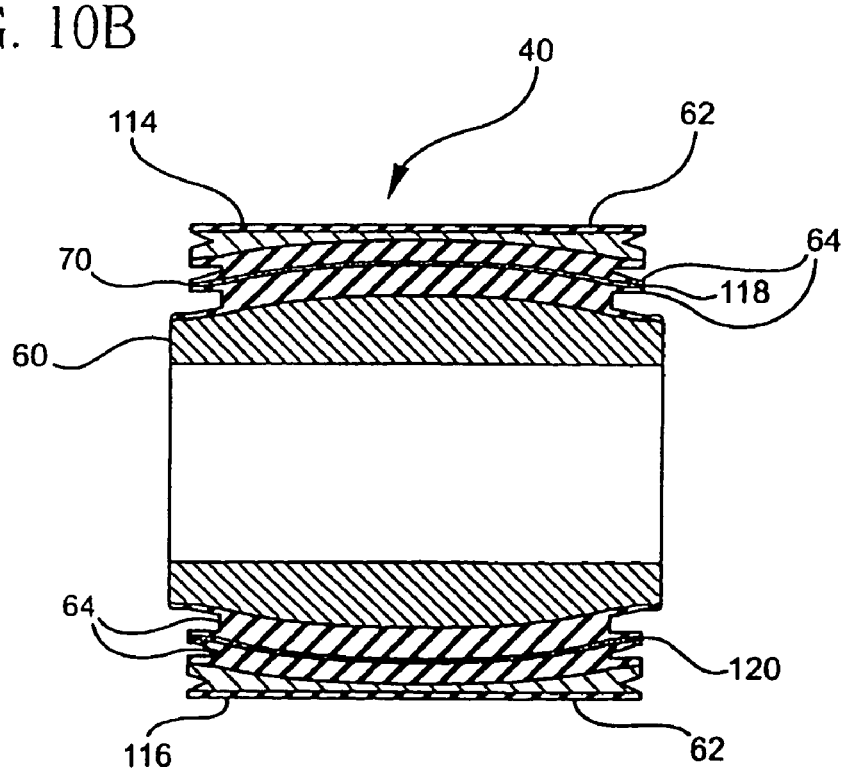
Figure 10C:
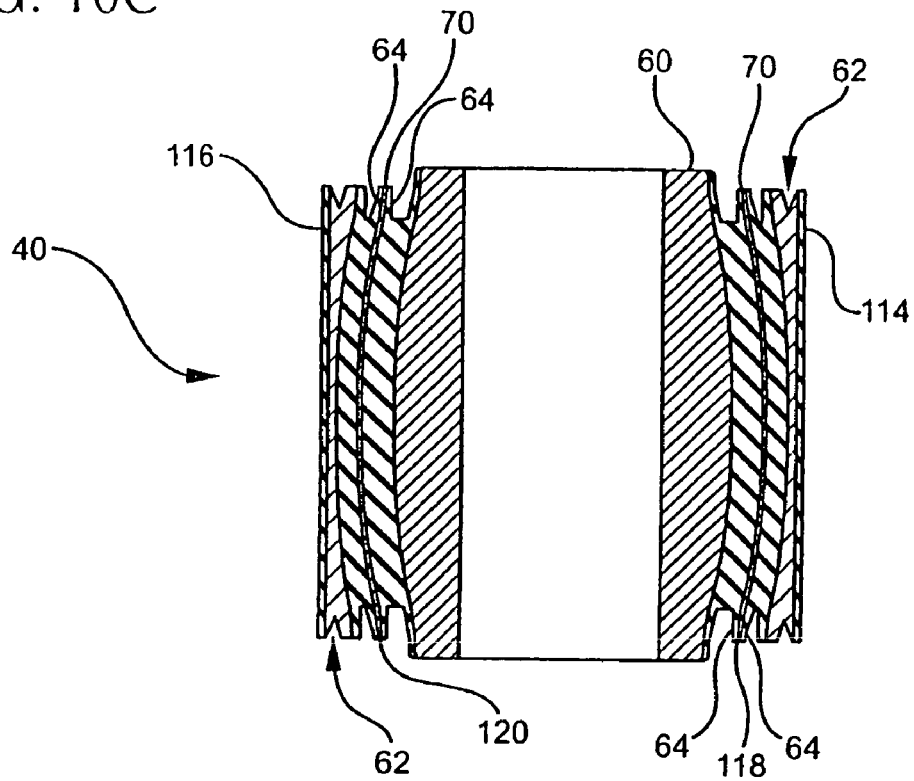
Figure 10D:
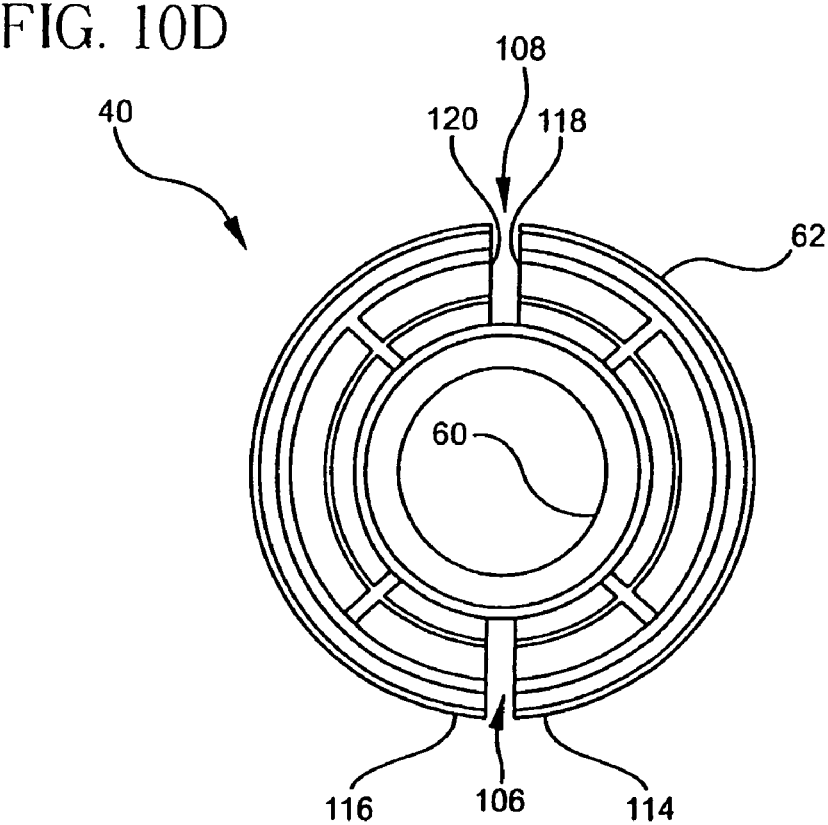
Figure 10E:
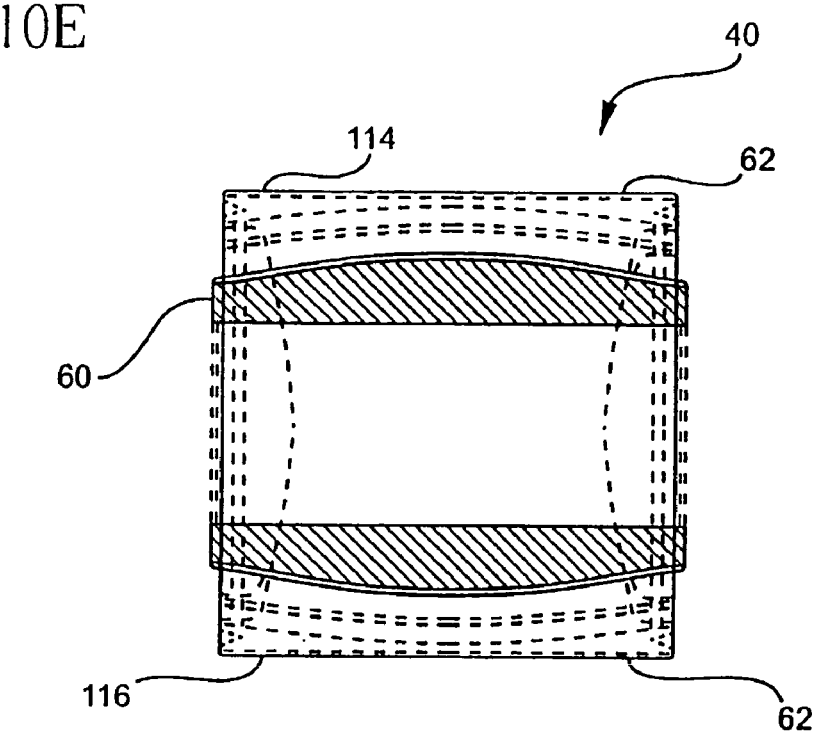
Figure 10F:
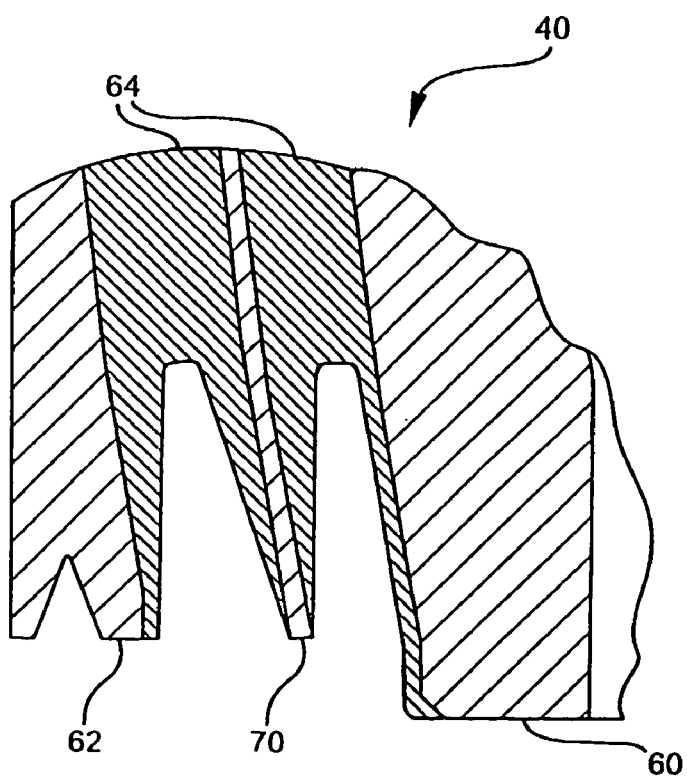
Figure 11A:
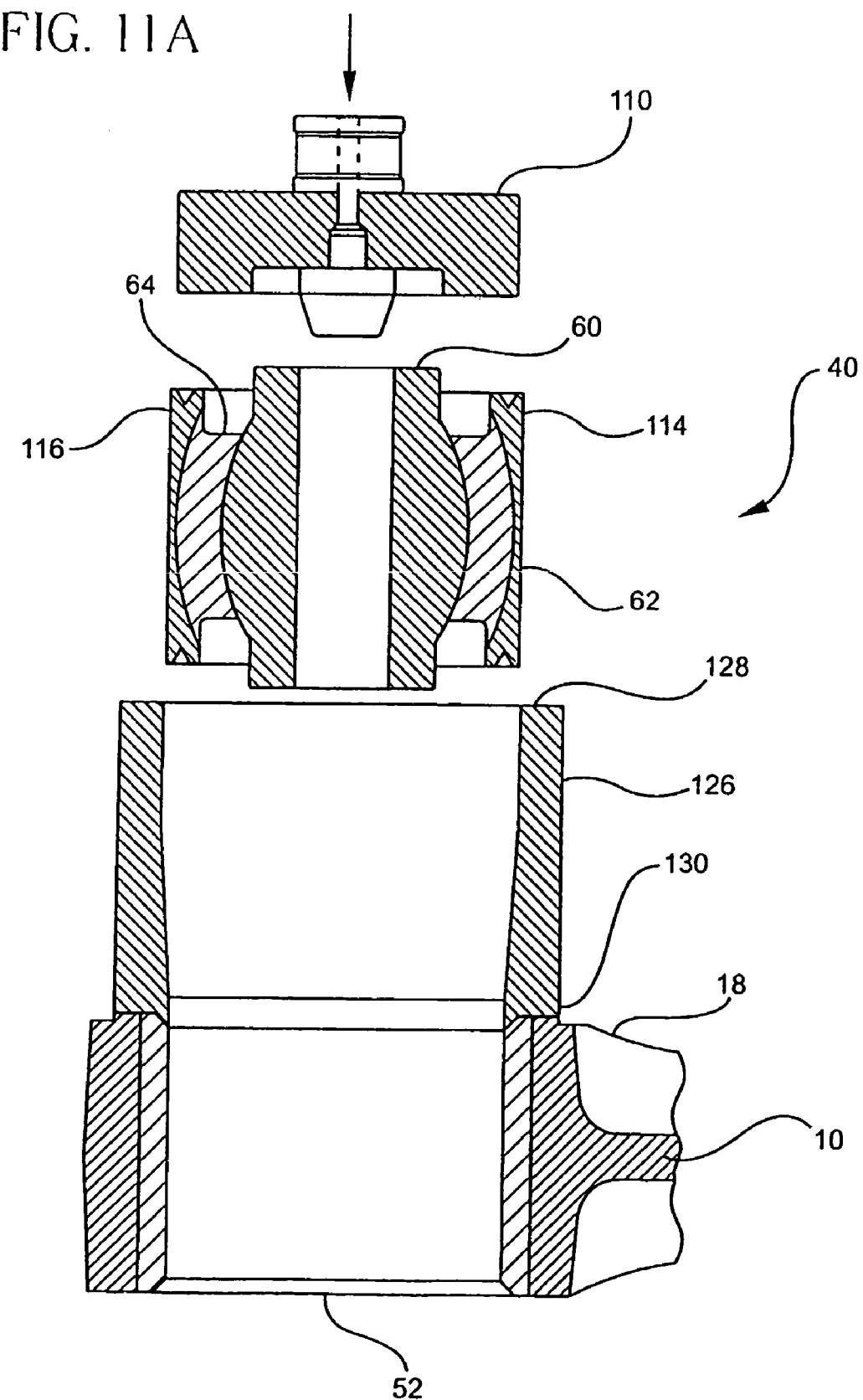
FIG. 11A-B show embodiments of the invention.
Figure 11B:
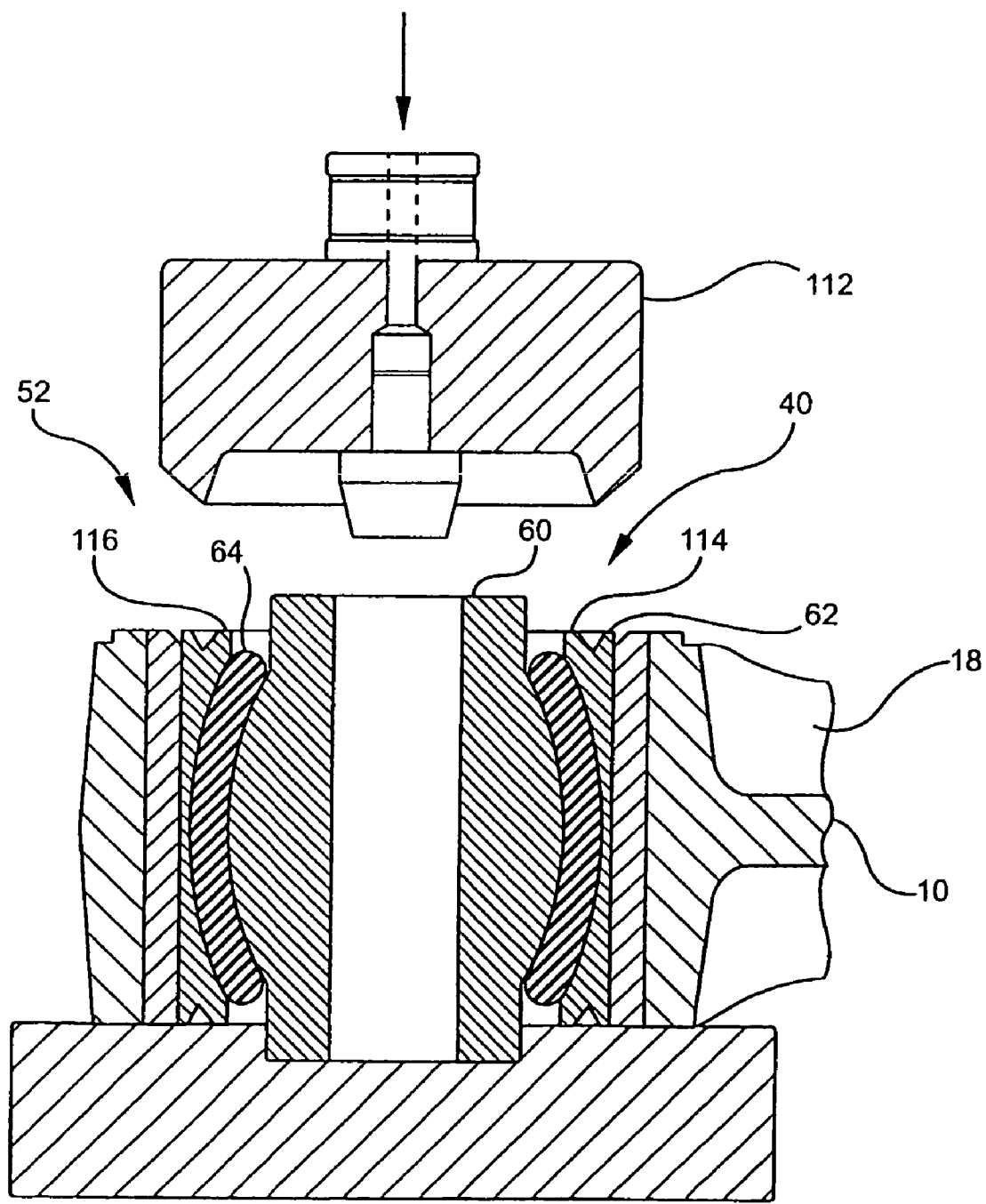

Referring to FIG. 7, as described above, the pin structure 30 is inserted through the saddle structure 48 (FIG. 3) associated with the cab assembly of the dozer or the roller frame assembly 32 (FIGS. 2 and 4) associated with the tracks or wheels of the dozer and the elastomeric bearing assembly 40 (FIGS. 3, 4, 5, and 6) of the present invention, securing the tracks or wheels to the cab assembly while allowing a plurality of axial, cocking, and torsion motions there between. Specifically, the pin assembly 30 securely engages the inner member 60 of the elastomeric bearing assembly 40. Preferably, the pin structure 30 has a substantially circular cross-sectional shape. The pin structure 30 may have a plurality of radii, including, for example, a first radius 80 and a second radius 82, wherein the first radius 80 is larger than the second radius 82. The pin structure 30 may be made of a metal, a metal alloy, a composite, or any other suitable material. Preferably, a portion of the second radius 82 of the pin structure 30 forming a notch 84 is configured to fixedly engage a slot 86 disposed within a plate structure 88. The plate structure 88 is fixedly attached to the roller frame assembly 32 associated with the tracks or wheels of the dozer. Thus, the pin structure 30 prevents the inner member 60 of the elastomeric hearing assembly 40 from rotating with respect to the roller frame assembly 32. Alternatively, a collar 90 disposed about the second radius 82 of the pin structure 30 may form the 84 operable for engaging the slot 86 disposed within the plate structure 88. The collar may be made of a metal, a metal alloy, a composite material, or any other suitable material. The pin stricture 30 and, specifically, the notch 84 and the collar 90 are shown in greater detail in FIG. 8.

The invention includes a method of making an earth-moving waste handling moving track-type tractor vehicle dozer maintenance repair for a dozer 100 with moving tracks 102, preferably with elevated drive sprockets 104 that drive the moving tracks 102 around the moving track roller frames 32. The invention includes providing a moving tracks dozer equalizer link 10, with the equalizer link including a worn lubricated spherical end bearing 20 in an end portion substantially circular bore 52 of an end portion 18 and removing the worn lubricated spherical end bearing from the dozer equalizer link end portion 18. The method includes providing an unlubricated laminated elastomeric bearing assembly 40. The laminated elastomeric bearing assembly 40 including a concentric outer nonextensible solid member 62 operable for securely engaging said dozer equalizer link end portion bore 52 of the end portion 18, a concentric inner nonextensible solid member 60 operable for securely engaging a pin structure 30 associated with a second structural member 32, the concentric inner member 60 disposed substantially within the concentric outer member 62, and an elastomeric section elastomer 64 bonded between the concentric inner member 60 and the concentric outer member 62. The method includes providing a pressing ram apparatus 110, and pressing said elastomeric bearing assembly 40 with the pressing ram 110 into the dozer equalizer link end portion bore 52 wherein the concentric outer nonextensible solid member 62 engages the dozer equalizer link end portion bore 52 and said elastomeric section 64 is precompressed. Preferably the pressing of the elastomeric bearing 40 into the link end is followed by staking the solid member 62 with a staking die 112 to further fix the bearing 40 in place in the bore 52 by crimping an edge of the outer member 62 towards the link end 18. Preferably providing said elastomeric bearing assembly 40 with a concentric outer nonextensible solid member 62 includes providing an elastomeric bearing assembly with said concentric outer nonextensible solid member 62 comprised of an outer member first split half 114 and an outer member second split half 116, with the outer member first split half 114 separated from the outer member second split half 116 wherein pressing the elastomeric bearing 40 into the bore presses the separated outer member first split half 114 and said outer member second split half 116 together and radially compresses the elastomeric section 64 between said concentric outer nonextensible solid 62 member and said concentric inner nonextensible solid member 60, preferably with the outer member first split half 114 comprised of a first split cylinder tube half and the outer member second split half 116 comprised of a second split cylinder tube half and the concentric inner member 60 comprised of a nonsplit unitary cylindrical tube such as shown in FIG. 12C-F. Preferably the elastomeric bearing assembly 40 includes at least one concentric nonextensible solid shim member 70 bonded in the elastomeric section 64 between the concentric outer member 62 and said concentric inner member 60. Preferably the at least one concentric nonextensible solid shim member 70 is comprised of a shim member first split half 118 and a shim member second split half 120 with the first shim member split half 118 separated from the second shim member split half 120. Preferably the concentric outer nonextensible solid member 62 is a substantially cylinder-shaped concentric outer member with an inner cylinder surface 122 and the concentric inner nonextensible solid member 60 is a substantially cylinder-shaped concentric inner member with an outer cylinder surface 124, with said elastomeric section 64 bonded to the inner cylinder surface 122 and the outer cylinder surface 124. Preferably the inner member 60 is non-split and pressing the hearing 40 into the bore 52 radially compresses the elastomer 64 between the inner and outer members and closes the split gaps 106 and 108. Preferably the method includes providing an elastomeric bearing funnel 126 having a large diameter end 128 and a small diameter end 130, aligning and temporarily attaching the elastomeric bearing funnel 126 with said dozer equalizer link end portion bore 52 with the small diameter end 130 adjacent the bore 52. Preferably the elastomeric bearing has a dozer equalizer link operation life of at least 1000 hours, preferably 2000 dozer operations hour without the need for lubricating.

The invention includes an earth-moving waste handling moving track-type tractor vehicle dozer 100 with moving tracks 102, preferably with elevated drive sprockets 104 that drive the moving tracks 102 around the moving track roller frames 32. The dozer 100 has a first left side moving track roller frame assembly 32 and a second right side moving track roller frame assembly 32 with an equalizer link 10 between said first moving track roller frame assembly 32 and said second moving track roller frame assembly 32. The equalizer link 10 has a first end portion 18 with a first end portion substantially circular bore 52 and a second distal end portion 22 with a second end portion substantially circular bore 52, with a first unlubricated laminated elastomeric end bearing assembly 40 received in the first end portion substantially circular bore 52 and a second unlubricated laminated elastomeric end bearing assembly 40 received in the second end portion substantially circular bore 52. The first elastomeric end bearing assembly 40 including a concentric outer nonextensible solid member 62 securely engaging the first end portion bore 52, a concentric inner nonextensible solid member 60 disposed substantially within the concentric outer member 62, and an elastomeric section 64 bonded between the concentric inner member 60 and the concentric outer member 62 with the elastomeric section 64 radially compressed between said concentric outer and inner member. The concentric inner member 60 links the equalizer link first end portion 18 with said first moving track roller frame assembly 32. The second unlubricated laminated elastomeric end bearing assembly 40 includes a concentric outer nonextensible solid member 62 securely engaging the second end portion bore 52, a concentric inner nonextensible solid member 60 disposed substantially within the concentric outer member with an elastomeric section 64 bonded between the concentric inner member 60 and the concentric outer member 62 with the elastomeric section 64 radially compressed between the concentric outer and inner members. The concentric inner member 60 links the equalizer link second end portion 22 with the second moving track roller frame assembly 32. Preferably the elastomeric end bearings 40 in the equalizer link ends provide dozer equalizer link operation life of at least 1000 hours, preferably 2000 dozer operations hours without the need for lubricating. Preferably the first elastomeric bearing assembly concentric outer nonextensible solid member 62 is comprised of a first elastomeric bearing assembly outer member first split half 114 and a first elastomeric bearing assembly outer member second split half 116 with the elastomeric bearing assembly 40 pressed into said bore 52 with said elastomeric section 64 radially compressed between concentric outer nonextensible solid member split halves 114 and 116 and the nonsplit concentric inner nonextensible solid member 60. Preferably the second elastomeric bearing assembly concentric otter nonextensible solid member 62 is comprised of a second elastomeric bearing assembly outer member first split half 114 and a second elastomeric bearing assembly outer member second split half 116 with the elastomeric hearing assembly 40 pressed into the bore 52 with the elastomeric section 64 radially compressed between said concentric outer nonextensible solid member halves 114,116 and the nonsplit concentric inner nonextensible solid member 60, preferably with the first half 114 being a first split cylinder half and the second half 116 being a second split cylinder half. Preferably the first elastomeric bearing assembly 40 includes at least one concentric nonextensible solid shim member 70 bonded in the elastomeric section 64 between the concentric outer member 62 and the concentric inner member 60 and the second elastomeric bearing assembly 40 includes at least one concentric nonextensible solid shim member 70 bonded in the elastomeric section 64 between said concentric outer member 62 and the concentric inner member 60, most preferably with the shim member 70 being a tubular cylinder shape. Preferably the first elastomeric bearing assembly at least one concentric nonextensible solid shim member 70 is comprised of a shim member first split half 118 and a shim member second split half 120, preferably a split cylinder shaped half 118 and a split cylinder shaped half 120, and the second elastomeric bearing assembly at least one concentric nonextensible solid shim member 70 is comprised of a shim member first split half 118 and a shim member second split half 120, preferably a split cylinder shaped half 118 and a split cylinder shaped half 120. Preferably the first elastomeric bearing assembly concentric outer nonextensible solid member 62 is a substantially cylinder-shaped concentric outer member with an inner cylinder surface 122 and said first elastomeric bearing assembly concentric inner nonextensible solid member 60 is a substantially cylinder-shaped concentric inner member with an outer cylinder surface 124, with the first elastomeric bearing assembly elastomeric section 64 bonded to the first elastomeric bearing assembly inner cylinder surface 122 and the first elastomeric bearing assembly outer cylinder surface 124. Preferably the inner member 60 is non-split and pressing the assembly 40 into the bore 52 radially compresses the elastomer 64 between the inner and outer member halves. The second elastomeric bearing assembly concentric outer nonextensible solid member 62 is a substantially cylinder-shaped concentric outer member with an inner cylinder surface 122 and the second elastomeric bearing assembly concentric inner nonextensible solid member 60 is a substantially cylinder-shaped concentric inner member with an outer cylinder surface 124, with the second elastomeric bearing assembly elastomeric section 64 bonded to the second elastomeric bearing assembly inner cylinder surface 122 and said second elastomeric bearing assembly outer cylinder surface 124, preferably with the inner member 60 nonsplit and pressing the assembly 40 into the bore 52 radially compresses the elastomer 64 between the inner member and the outer member halves.

The invention includes a moving tracks dozer equalizer link 10 for linking a first moving track roller frame assembly 32 and a second moving track roller frame assembly 32 of a dozer 100, preferably a dozer with elevated drive sprockets 104 that drive the moving tracks 102 around the moving track roller frames 32. The equalizer link 10 has a first end portion 18 with a first end portion substantially circular bore 52 and a second distal end portion 22 with a second end portion substantially circular bore 52, a first unlubricated laminated elastomeric end bearing assembly 40, said first elastomeric end bearing assembly 40 including a concentric outer nonextensible solid member 62 securely engaging the first end portion bore 52, a concentric inner nonextensible solid member 60, said concentric inner member 60 disposed substantially within the concentric outer member 62, and an elastomeric section 64 bonded between the concentric inner member and the concentric outer member. Preferably the elastomeric section 64 is radially compressed between the concentric outer member 62 and the inner member 60. The concentric inner member 60 linking the equalizer link first end portion 18 with the first moving track roller frame assembly 32. The equalizer link 10 includes a second unlubricated laminated elastomeric end bearing assembly 40, the second elastomeric end bearing assembly including a concentric outer nonextensible solid member 62 securely engaging second end portion bore 52, a concentric inner nonextensible solid member 60 disposed substantially within the concentric outer member 62, and an elastomeric section 64 bonded between the concentric inner member and the concentric outer member with the elastomeric section 64 radially compressed between the concentric outer and inner members with the concentric inner member 60 linking equalizer link second end portion 22 with the second moving track roller frame assembly 32. Preferably the elastomeric end bearings 40 in the equalizer link ends provide dozer equalizer link operation life of at least 1000 hours, preferably 2000 dozer operations hours without the need of lubrication. Preferably the first elastomeric bearing assembly concentric outer nonextensible solid member 62 is comprised of a first elastomeric bearing assembly outer member first split half 114 and a first elastomeric bearing assembly outer member second split half 116 with the elastomeric bearing assembly pressed into the bore with the elastomeric section 64 radially compressed between said concentric outer nonextensible solid member halves and the concentric inner nonextensible solid member 60 and the second elastomeric bearing assembly concentric outer nonextensible solid member 62 is comprised of a second elastomeric bearing assembly outer member first split half 114 and a second elastomeric bearing assembly outer member second split half 116 with the elastomeric bearing assembly pressed into the bore with the elastomeric section radially compressed between the concentric outer nonextensible solid member and the concentric inner nonextensible solid member, (preferably with the second elastomeric bearing assembly outer member first split half 114 being a first split cylinder half and the second elastomeric bearing assembly outer member second split half 116 being a second split cylinder half. Preferably the first elastomeric bearing assembly 40 includes at least one concentric nonextensible solid shim member 70 bonded in the elastomeric section 64 between the concentric outer member 62 and the concentric inner member 60 and the second elastomeric bearing assembly 40 includes at least one concentric nonextensible solid shim member 70 bonded in the elastomeric section 64 between the concentric outer member 62 and the concentric inner member 60, preferably with the shim member 70 having a cylinder tube shape. Preferably the first elastomeric bearing assembly at least one concentric nonextensible solid shim member 70 is comprised of a shim member first split half 118 and a shim member second split half 120 preferably being split cylinder tube shaped. Preferably the second elastomeric bearing assembly at least one concentric nonextensible solid shim member 70 is comprised of a shim member first split half 118 and a shim member second split half 120 preferably being split cylinder tube shaped. Preferably the first elastomeric bearing assembly concentric outer nonextensible solid member 62 is a substantially cylinder-shaped concentric outer member with an inner cylinder surface 122 and said first elastomeric bearing assembly concentric inner nonextensible solid member 60 is a substantially cylinder-shaped concentric inner member with an outer cylinder surface 124, with the first elastomeric bearing assembly elastomeric section 64 bonded to the first elastomeric bearing assembly inner cylinder surface 122 and said first elastomeric bearing assembly outer cylinder surface 124 with the inner member non-split and pressing the assembly into the bore 52 radially compresses the elastomer 64 between the inner and outer members. Preferably the second elastomeric bearing assembly concentric outer nonextensible solid member 62 is a substantially cylinder-shaped concentric outer member with an inner cylinder surface 122 and said second elastomeric bearing assembly concentric inner nonextensible solid member 60 is a substantially cylinder-shaped concentric inner member with an outer cylinder surface 124, with the second elastomeric bearing assembly elastomeric section 64 bonded to the second elastomeric bearing assembly inner cylinder surface 122 and the second elastomeric bearing assembly outer cylinder surface 124. Preferably the inner member is non-split and pressing the assembly 40 into the bore 52 radially compresses the elastomer between the inner and outer member.

Figure 12A:
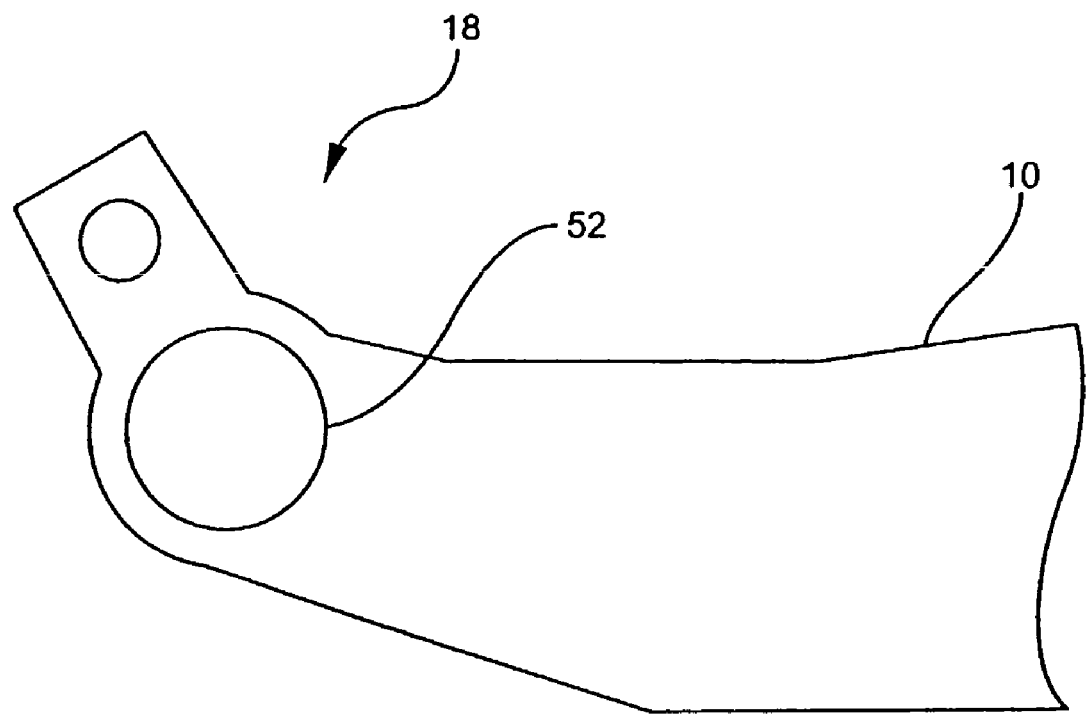
FIG. 12A-F slow embodiments of the invention.
Figure 12B:
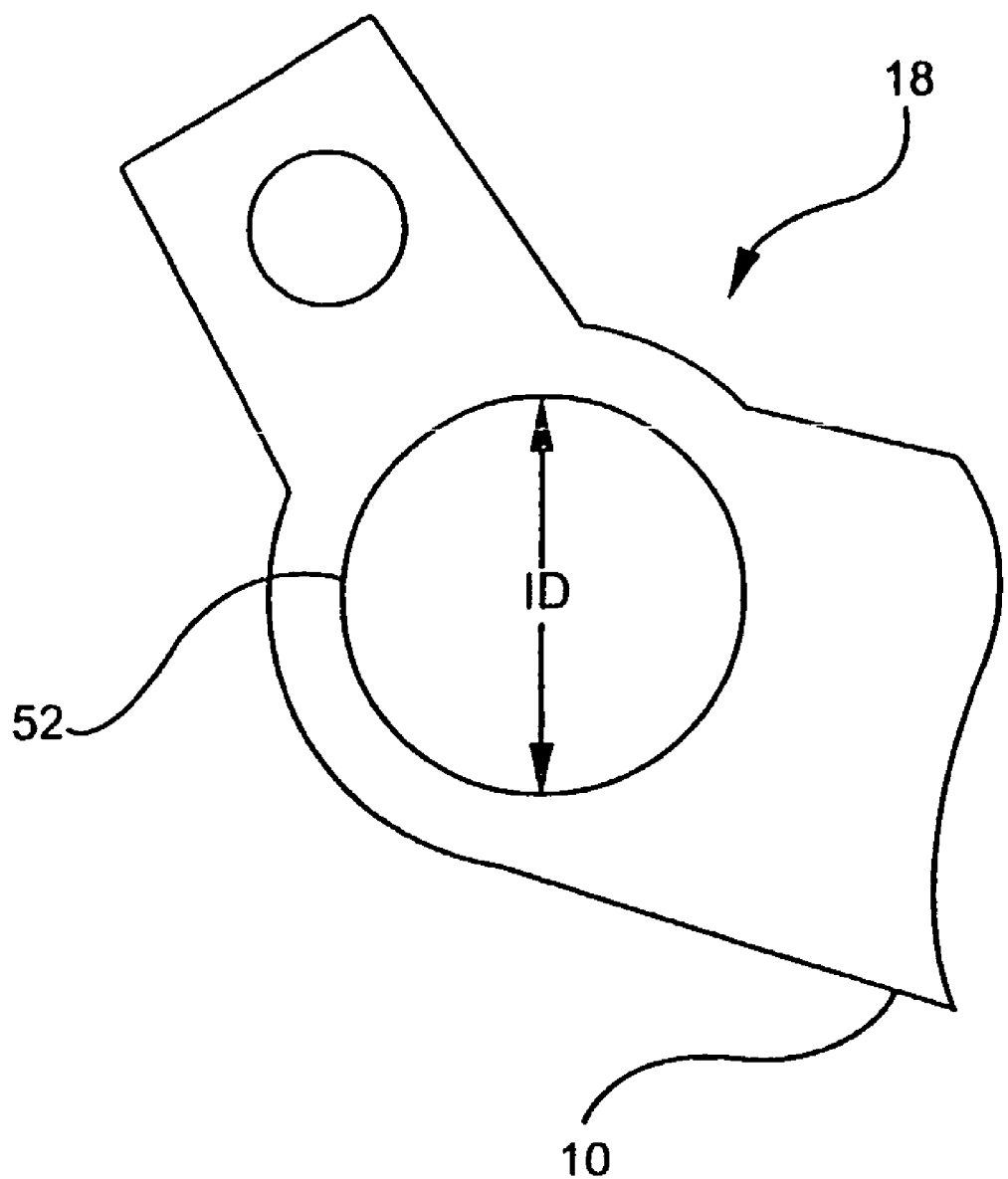
Figure 12C:
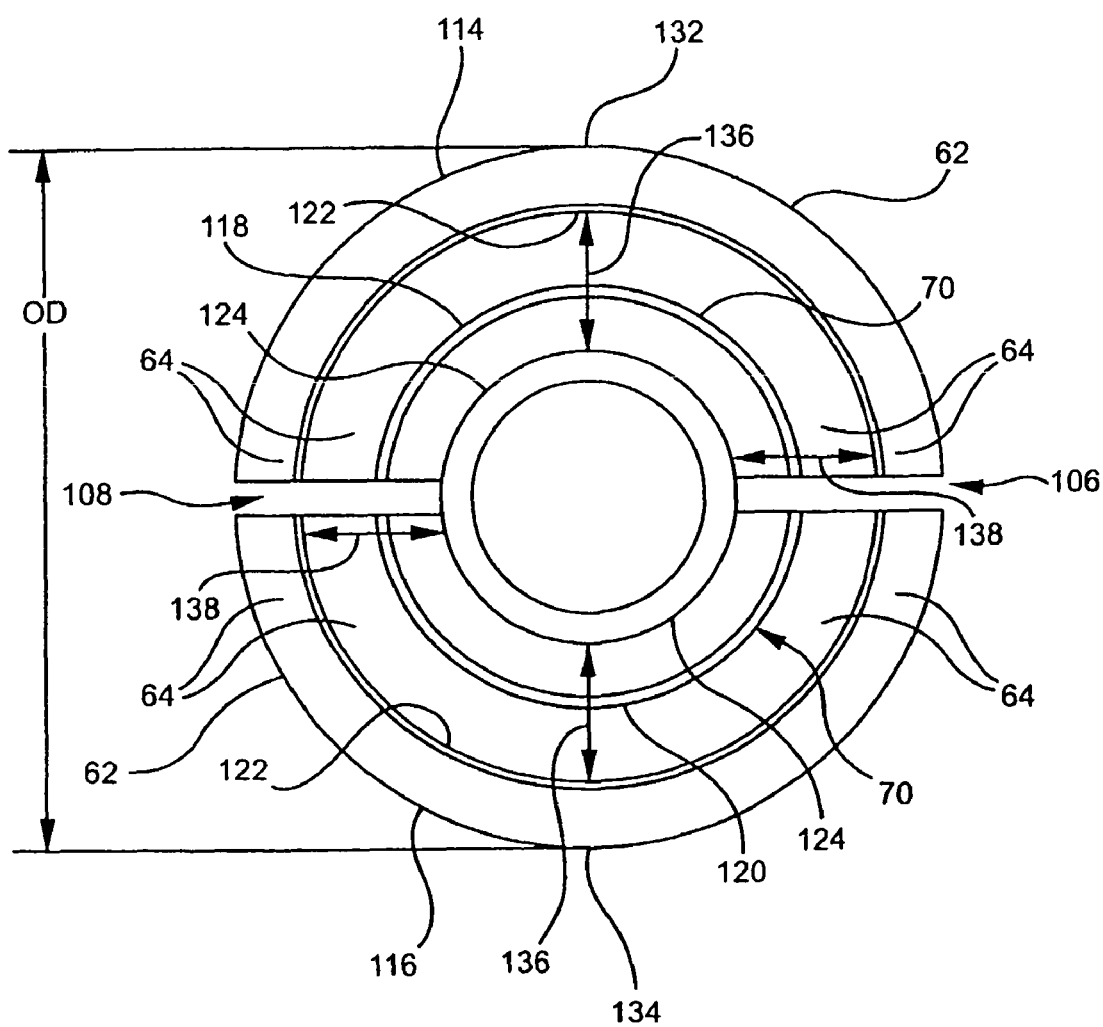
Figure 12D:
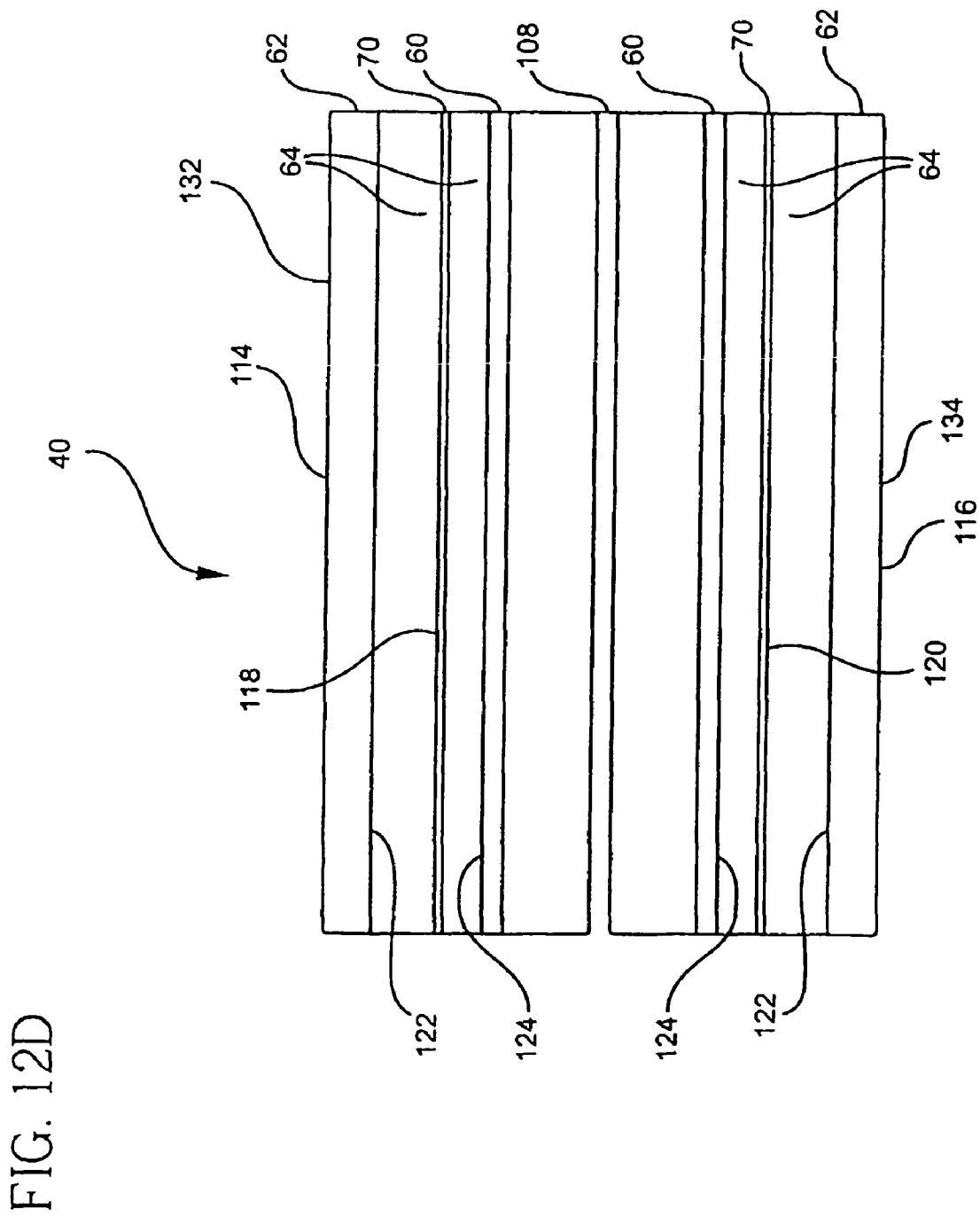
Figure 12E:
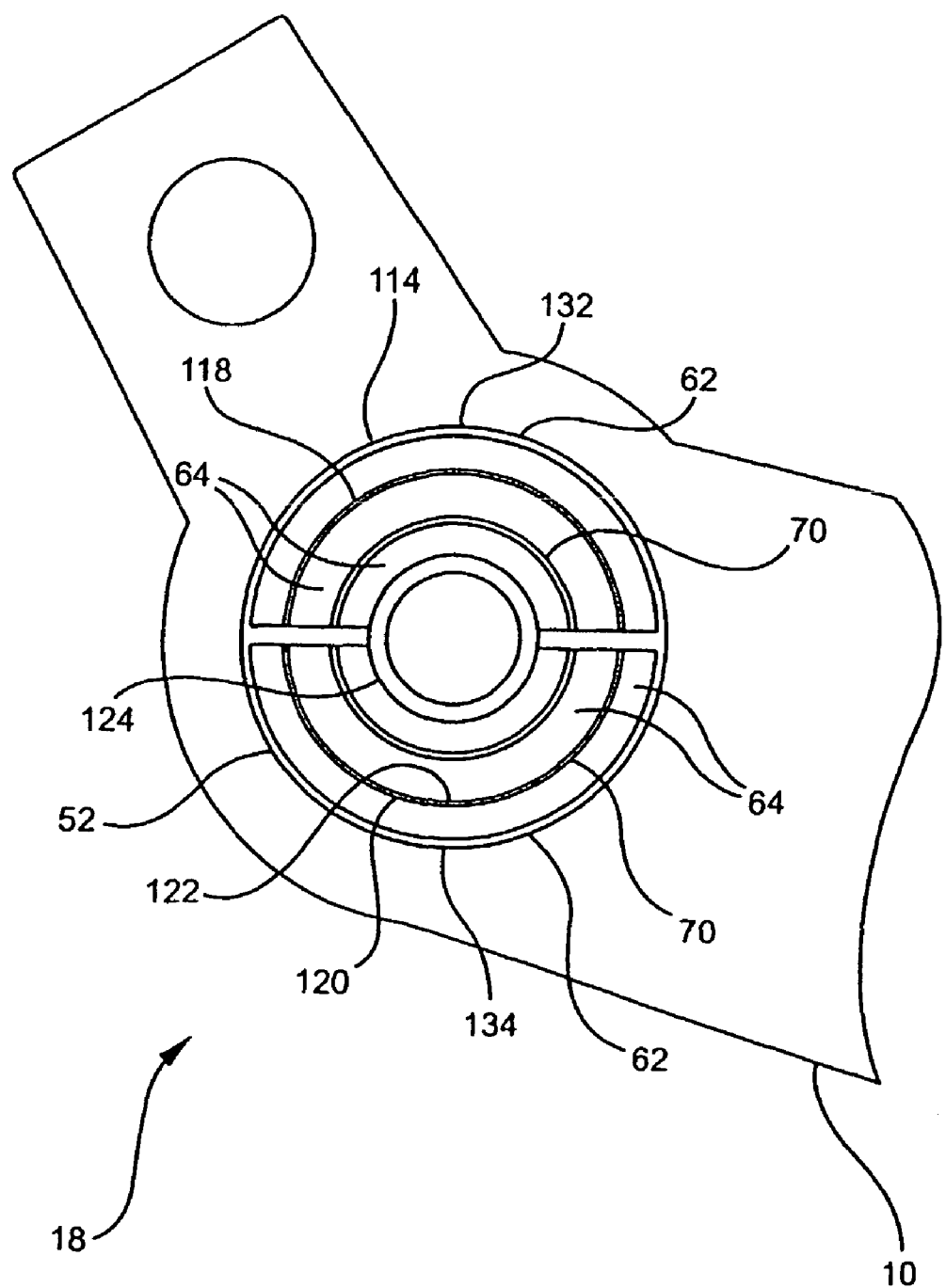
Figure 12F:
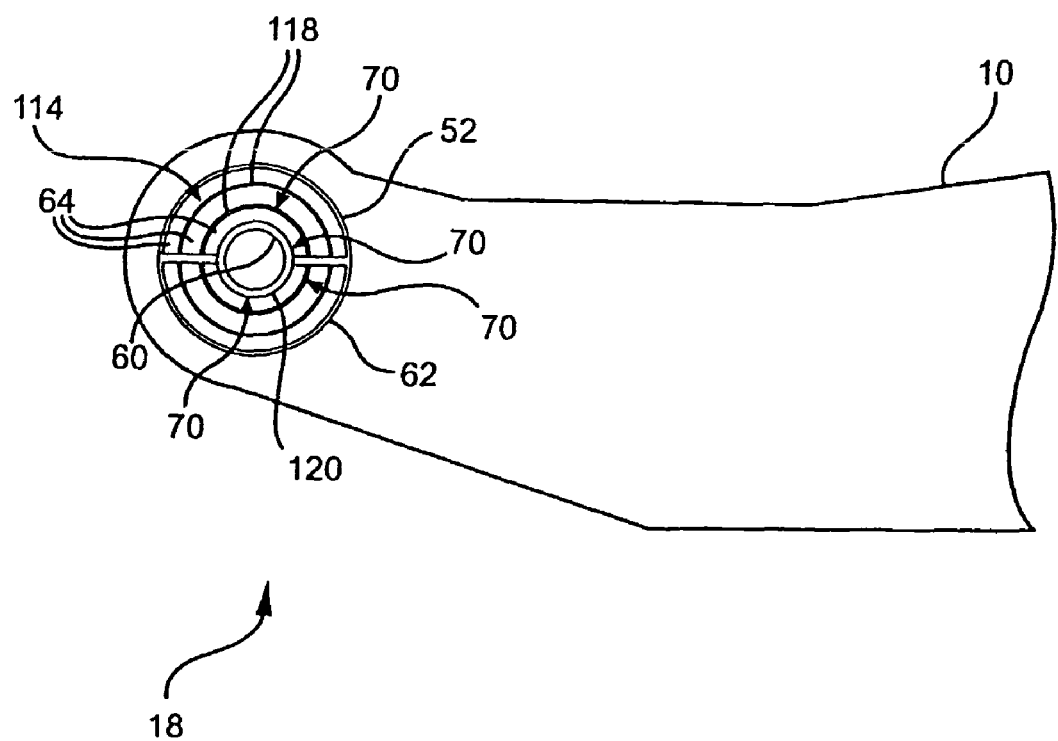

The invention includes a method of making a dozer equalizer link elastomeric bearing assembly 40 for a moving tracks dozer equalizer link 10 having a substantially circular equalizer link bore 52 with an inside diameter ID. The method comprises the steps of providing a cylindrical tubular nonextensible solid concentric inner member 60, providing a concentric outer member first outer member nonextensible solid split tubular cylinder-half 114 with an outside top 132 and a concentric outer member second outer member nonextensible solid split tubular cylinder half 116 with in outside bottom 134, concentrically disposing the cylindrical tubular nonextensible solid concentric inner member 60 substantially within the concentric outer member first outer member nonextensible solid split tubular cylinder half 114 and the concentric outer member second outer member nonextensible solid split tubular cylinder half 116, elastomerically bonding the cylindrical tubular nonextensible solid concentric inner member 60 to the first outer member nonextensible solid split tubular cylinder half 114 and the second outer member nonextensible solid split tubular cylinder half 116 with an elastomer 64 with all elastomeric section in between the inner and outer members to form an elastomeric bearing assembly 40 with an outside diameter OD from first outer member nonextensible solid split tubular cylinder half outside top 132 to the second outer member nonextensible solid split tubular cylinder half outside bottom 134 wherein the elastomeric bearing assembly outside OD is at least a hundred and five percent of the equalizer link bore inside diameter ID for which is to be pressed into. Preferably the elastomeric bearing assembly outside diameter OD>ID of the equalizer link bore inside diameter ID, preferably with $0.95OD \geq ID$. Preferably the made elastomeric end bearings has a dozer equalizer link operation life of at least 1000 hours, preferably 2000 dozer operations hours without the need of lubrication. Preferably the thickness of the elastomeric section 64 thickens from a thinner elastomer section thickness 136 to a thicker elastomer section thickness 138 as a function of the radial progression from the outside top 132 and outside bottom 134 positions radially towards the split gaps 106 and 108, with the installed bearing 40 pressed into the bore 52 having a radially uniform elastomeric section 64 thickness. In a preferred embodiment such as shown in FIG. 12C-E the elastomeric bearing 410 has one concentric shim member 70 that is comprised of a first split half shim 118 and a second split half shim 120. Preferably the bearing with the elastomeric bearing assembly outside OD pressed into and installed for dozer operation has an elastomeric precompression of at least 5%, preferably at least 10%, from the radially compression of the elastomeric section 64 between the outer member 62 and the inner member 60. Such elastomeric precompression being the difference between the total elastomeric thickness as made bonded and the total elastomer thickness as installed in the equalizer link bore, divided by the total elastomer thickness as made bonded, multiplied by 100 [((total elastomer thickness as made bonded-total elastomer thickness as installed)/(total elastomer thickness as made bonded)$\times 100) \geq 5$, preferably $\geq 10$]. The method includes providing a concentric shim member first shim member nonextensible solid split tubular cylinder half 118 and a concentric shim member second shim member nonextensible solid split tubular cylinder half 120, concentrically disposing said first shim member nonextensible solid split tubular cylinder half 118 between said first outer member nonextensible solid split tubular cylinder half 114 and the cylindrical tubular nonextensible solid concentric inner member 60 and the second shim member nonextensible solid split tubular cylinder half 120 between the second outer member nonextensible solid split tubular cylinder half 116 and the cylindrical tubular nonextensible solid concentric inner member 60 wherein the shim members are elastomerically bonded in the elastomer 64 between the inner member and said outer members. Preferably the elastomer 64 defines a first split gap 106 which separates said first outer member nonextensible solid split tubular cylinder half from said second outer member nonextensible solid split tubular cylinder half and the first shim member nonextensible solid split tubular cylinder half from the second shim member nonextensible solid split tubular cylinder half, and a second split gap 108 which separates the first outer member nonextensible solid split tubular cylinder half from the second outer member nonextensible solid split tubular cylinder half and the first shim member nonextensible solid split tubular cylinder half from the second shim member nonextensible solid split tubular cylinder half. Preferably the elastomeric bearing 40 is oriented and aligned in the bore 52 of the dozer equalizer link 10 with the first split gap 106 and the second split gap 108 in alignment with the longitudinal length of the equalizer link with the split gaps substantially normal to the static load of the dozer.

Although the elastomeric bearing assembly of the present invention has been shown and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A method of repairing a dozer with moving tracks, said method comprising: providing a moving tracks dozer equalizer link, said equalizer link including a worn lubricated end bearing in an end portion bore, removing said worn lubricated end bearing from said dozer equalizer link end portion bore to provide an empty dozer equalizer link end portion bore having a substantially circular equalizer link bore with an inside diameter ID, providing an elastomeric bearing assembly, said elastomeric bearing assembly including a concentric outer nonextensible member operable for securely engaging said dozer equalizer link end portion bore, with said concentric outer member comprised of an outer member first nonextensible split tubular top half having an outside top and an outer member second nonextensible split tubular bottom half having an outside bottom, with said elastomeric bearing assembly concentric outer nonextensible solid member having an outside diameter OD from said outer member first nonextensible split tubular top half outside top to said outer member second nonextensible split tubular bottom half outside bottom, said outer member first nonextensible split tubular top and said outer member second nonextensible split tubular bottom half split by a first split gap and a second split gap, a concentric non-split inner member operable for securely engaging a pin, said concentric non-split inner member disposed substantially within the concentric outer member, and an elastomeric section bonded between the concentric inner member and the concentric outer member, providing a pressing ram apparatus, and pressing said elastomeric bearing assembly with said pressing ram apparatus into said empty dozer equalizer link end portion bore with said inside diameter ID wherein said concentric outer nonextensible member first nonextensible split tubular top half and second nonextensible split tubular bottom half securely engages said dozer equalizer link end portion bore inside diameter ID with said elastomeric bearing assembly outside diameter OD at least a hundred and five percent of said equalizer link bore inside diameter ID and said elastomeric section is precompressed.

2. A method as claimed in claim 1, wherein said elastomeric bearing assembly includes at least one concentric shim member bonded in said elastomeric section between said concentric outer member and said concentric inner member.

3. A method as claimed in claim 2, wherein said at least one concentric shim member is comprised of a shim member first split half and a shim member second split half.

4. A method as claimed in claim 2, wherein said concentric outer member is a substantially cylinder-shaped concentric outer member with an inner cylinder surface and said concentric inner member is a substantially cylinder-shaped concentric inner member with an outer cylinder surface, with said elastomeric section bonded to said inner cylinder surface and said outer cylinder surface.

5. A method as claimed in claim 1, further including staking said concentric outer nonextensible member with a staking die.

6. A method as claimed in claim 1, said method including providing an elastomeric bearing funnel having a large diameter end and a small diameter end, aligning said elastomeric bearing funnel with said dozer equalizer link end portion bore with said small diameter end adjacent said bore.

7. A method as claimed in claim 1, wherein said pressed in elastomeric bearing assembly provides a dozer equalizer link operation life of at least 1000 hours.

8. A method as claimed in claim 1, wherein said pressed in elastomeric bearing assembly provides a dozer equalizer link operation life of at least 2000 hours.

9. A method of repairing a vehicle with moving tracks, said method comprising: providing a moving tracks vehicle equalizer link, said equalizer link including a worn lubricated end bearing in an end portion bore, removing said worn lubricated end bearing from said vehicle equalizer link end portion bore, providing an empty vehicle equalizer link end portion bore having a substantially circular equalizer link bore with an inside diameter ID, providing an elastomeric bearing assembly, said elastomeric bearing assembly including a concentric outer nonextensible member operable for securely engaging said vehicle equalizer link end portion bore, with said concentric outer member comprised of an outer member first nonextensible split tubular top half having an outside top and an outer member second nonextensible split tubular bottom half having an outside bottom, with said elastomeric bearing assembly concentric outer nonextensible solid member having an outside diameter OD from said outer member first nonextensible split tubular top half outside top to said outer member second nonextensible split tubular bottom half outside bottom, said outer member first nonextensible split tubular top and said outer member second nonextensible split tubular bottom half split by a first split gap and a second split gap, a concentric non-split inner member operable for securely engaging a pin, said concentric non-split inner member disposed substantially within the concentric outer member with an elastomeric section bonded between the concentric inner member and the concentric outer member, and pressing said elastomeric bearing assembly into said empty vehicle equalizer link end portion bore with said inside diameter ID wherein said concentric outer nonextensible member first nonextensible split tubular top half and second nonextensible split tubular bottom half securely engages said vehicle equalizer link end portion bore inside diameter ID with said elastomeric bearing assembly outside diameter OD at least a hundred and five percent of said equalizer link bore inside diameter ID and said elastomeric section is precompressed.

* * * * *